(12) United States Patent
Hendry et al.

(10) Patent No.: US 10,742,985 B2
(45) Date of Patent: *Aug. 11, 2020

(54) VIDEO ENCODING AND DECODING METHOD BASED ON ENTRY POINT INFORMATION IN A SLICE HEADER, AND APPARATUS USING SAME

(71) Applicant: LG ELECTRONICS INC., Seoul (KR)

(72) Inventors: Hendry Hendry, Seoul (KR); Byeongmoon Jeon, Seoul (KR); Yongjoon Jeon, Seoul (KR); Seungwook Park, Seoul (KR); Jungsun Kim, Seoul (KR); Joonyoung Park, Seoul (KR); Jaehyun Lim, Seoul (KR); Naeri Park, Seoul (KR); Chulkeun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/292,037

(22) Filed: Mar. 4, 2019

(65) Prior Publication Data

US 2019/0200018 A1  Jun. 27, 2019

Related U.S. Application Data

(63) Continuation of application No. 15/860,412, filed on Jan. 2, 2018, now Pat. No. 10,356,414, which is a
(Continued)

(51) Int. Cl.
*H04N 5/92* (2006.01)
*H04N 7/32* (2006.01)
(Continued)

(52) U.S. Cl.
CPC .......... *H04N 19/13* (2014.11); *H04N 19/436* (2014.11); *H04N 19/91* (2014.11); *H04N 21/6336* (2013.01); *H04N 19/124* (2014.11)

(58) Field of Classification Search
CPC ...... H04N 19/13; H04N 19/91; H04N 19/436; H04N 21/6336; H04N 19/124
See application file for complete search history.

(56) References Cited

U.S. PATENT DOCUMENTS

| 7,916,363 B2 | 3/2011 | Rynderman |
| 9,077,998 B2 | 7/2015 | Wang |

(Continued)

FOREIGN PATENT DOCUMENTS

| CN | 1366768 A | 8/2002 |
| CN | 1617593 A | 5/2005 |

(Continued)

OTHER PUBLICATIONS

Misra, Harmonization of Entry Points for Tiles and Wavefront Processing, Joint Collaborative Team on Video Coding (JCT-VC) of ITU-T SG16WP3 and ISO/IEC JTC1/SC29/WG11 7th Meeting: Geneva, Switzerland, Nov. 21-30, 2011, Document: JCTVC-G722, entire document.

(Continued)

*Primary Examiner* — Alison Slater
(74) *Attorney, Agent, or Firm* — Dentons US LLP

(57) ABSTRACT

A video encoding method includes deriving entry point information specifying an entry point of a substream for a picture. The entry point information includes an offset syntax element when the number of the offset syntax elements is larger than 0, where the offset syntax element represents an entry point offset between two entry points. The entry point information includes a length syntax element when the number of the offset syntax elements is larger
(Continued)

than 0, where the length syntax element represents a bits length for the offset syntax element. The offset syntax element represents the number of bytes between the two entry points. A value of the length syntax element plus one corresponds to the bits length of the offset syntax element. A value of the number syntax element corresponds to the number of offset syntax elements in the slice header.

9 Claims, 18 Drawing Sheets

Related U.S. Application Data continuation of application No. 14/369,063, filed as application No. PCT/KR2012/011717 on Dec. 28, 2012, now Pat. No. 9,883,185.

(60) Provisional application No. 61/581,105, filed on Dec. 29, 2011, provisional application No. 61/582,822, filed on Jan. 4, 2012, provisional application No. 61/586,112, filed on Jan. 12, 2012, provisional application No. 61/597,145, filed on Feb. 9, 2012.

(51) Int. Cl.

| | | |
|---|---|---|
| G11B 20/10 | (2006.01) | |
| H04N 19/174 | (2014.01) | |
| G06K 9/36 | (2006.01) | |
| H04N 19/13 | (2014.01) | |
| H04N 19/91 | (2014.01) | |
| H04N 19/436 | (2014.01) | |
| H04N 21/6336 | (2011.01) | |
| H04N 19/124 | (2014.01) | |

(56) References Cited

U.S. PATENT DOCUMENTS

| | | | |
|---|---|---|---|
| 9,325,999 B2 | 4/2016 | Segall | |
| 9,332,259 B2 | 5/2016 | Wang | |
| 2003/0093800 A1 | 5/2003 | Demas et al. | |
| 2006/0233525 A1 | 10/2006 | Shibata et al. | |
| 2009/0180536 A1 | 7/2009 | Shimorfure | |
| 2011/0170791 A1 | 7/2011 | Rynderman | |
| 2012/0189049 A1* | 7/2012 | Coban | H04N 19/96 375/240.02 |
| 2013/0003830 A1 | 1/2013 | Misra | |
| 2013/0114735 A1 | 5/2013 | Wang | |

FOREIGN PATENT DOCUMENTS

| | | |
|---|---|---|
| CN | 1848942 A | 10/2008 |
| CN | 101507278 A | 8/2009 |
| CN | 102150425 A | 8/2011 |
| CN | 102232292 A | 11/2011 |
| EP | 1890495 A2 | 2/2008 |
| JP | 2006319943 | 11/2006 |
| JP | 2011217082 | 10/2011 |
| KR | 1020050078153 | 8/2005 |
| KR | 1020100052945 | 5/2010 |
| KR | 101038531 | 6/2011 |

OTHER PUBLICATIONS

Clare et al., "Wavefront Parallel Processing for HEVC Encoding and Decoding", Document JCTVC-F274; JCT-VC Meeting; MPEG Meeting; Jul. 14, 2011-Jul. 22, 2011; Torino; (Joint Collaborative Team on Video Coding of ISO/IEC/JTC1/SC29/WG11 and ITU-T SG. 16).

Fuldseth et al., "Tiles," Joint Collaborative Team on Video Coding, JCTVC-F335, Jul. 14-22, 2011.

Misra et al. New Results for Parallel Decoding for Tiles, Document: JCTVC-F594; Joint Collaborative Team on Video Coding (JCT-VC) of ITU-T SG16 WP3 and ISO/TEC JTC1/SC29/WG11, 6th Meeting; Torino, Italy, Jul. 14-22, 2011.

Hendry, et al., "AHG4: Harmonized Method for Signalling Entry Points of tiles and WPP Substreams", Joint Collaborative Team on Video Coding (JCT-VC) of ITU-T SG16 WP3 and ISO/IEC JTC1/SC29/WG11, Feb. 1-10, 2012, JCTVC-H0556.

Office Action of Chinese Patent Office in Appl'n No. 201810257779. 3, dated Mar. 2, 2020.

Office Action of Chinese Patent Office in Appl'n No. 201810257886. 6, dated Mar. 2, 2020.

U.S. Appl. No. 15/860,412, filed Jan. 2, 2018 (U.S. Pat. No. 10,356,414).

U.S. Appl. No. 14/369,063, filed Jun. 26, 2014 (U.S. Pat. No. 9,883,185).

Hsu, et al.: "Wavefront Parallel Processing with Tiles", JCTVC-F063, Joint Collaborative Team on Video Coding (JCT-VC) of ITU-T SG16 WP3 and ISO/IEC JTC1/SC29/WG11, 6th Meeting, Torino, IT, Jul. 14-22, 2011.

Misra, et al.: "Tiles for parallel decoding", JCTVC-E412, Joint Collaborative Team on Video Coding (JCT-VC) of ITU-T SG16 WP3 and ISO/IEC JTC1/SC29/WG11, 5th Meeting, Geneva, CH, Mar. 16-23, 2011.

\* cited by examiner

$X_x$ : Xth LCU (CTU) of substream X

VIDEO ENCODING AND DECODING METHOD BASED ON ENTRY POINT INFORMATION IN A SLICE HEADER, AND APPARATUS USING SAME

This application is a continuation of U.S. patent application Ser. No. 15/860,412, filed Jan. 2, 2018, now allowed, which is a continuation of U.S. patent application Ser. No. 14/369,063, filed Jun. 26, 2014, now U.S. Pat. No. 9,883,185, which is a National Phase application of International Application No. PCT/KR2012/011717, filed Dec. 28, 2012, and claims the benefit of U.S. Provisional Application Nos. 61/581,105, filed Dec. 29, 2011, 61/582,822, filed Jan. 4, 2012, 61/586,112, filed Jan. 12, 2012, and 61/597,145, filed Feb. 9, 2012, all of which are hereby incorporated by reference in their entirety for all purposes as if fully set forth herein.

TECHNICAL FIELD

The present invention relates to a video information compression technique, and more particularly, to a method of signaling a bitstream including video information and a method of parsing information using the same.

BACKGROUND ART

Recently, demands for high-resolution and high-quality images have increased in various fields of applications. As images have higher resolution and higher quality, the amount of information on the images also increases.

Accordingly, if video data is transmitted media such as existing wired and wireless broadband lines, or is stored using conventional storage media, the costs of transmitting and storing data also rise.

High-efficiency video compression techniques may be employed in order to effectively transmit, store, and reproduce information in videos with high resolution and high quality.

In order to improve video compression efficiency, inter prediction and intra prediction can be used. In inter prediction, pixel values within a current picture are predicted by referring to information on another picture. In intra prediction, pixel values within a current picture are predicted using connections between pixels within the same picture.

A processing unit of a predicted picture, for example, a block, may be subjected to various methods so as to render the picture identical to the original picture. Accordingly, a decoding apparatus may decode the picture more exactly to be identical to the original picture, and an encoding apparatus may encode the picture to be reconstructed more exactly.

DISCLOSURE

Technical Problem

An aspect of the present invention is to provide a method and apparatus for effectively signaling encoded video information.

Another aspect of the present invention is to provide a method and apparatus for setting an entry point in bytes and signaling the entry point when parallel decoding is used.

Still another aspect of the present invention is to provide a method and apparatus for performing parallel decoding using a byte-aligned decoding unit.

Yet another aspect of the present invention is to provide a method and apparatus for specifying information transmitted and received for performing parallel decoding using a byte-aligned decoding unit and performing encoding and decoding using the information.

Technical Solution

An embodiment of the present invention provides a video encoding method including entropy-encoding quantized transform information and transmitting the entropy-encoded information in a bitstream, wherein the bitstream comprises information specifying, in bytes, information to be subjected to parallel decoding.

The bitstream may include, in a slice header, offset information specifying an entry point of a row of coding tree units (CTUs) to be subjected to parallel decoding, and the offset information may indicate a number of bytes between two entry points.

The entropy-encoding may start entropy-encoding at an access point indicated by an entry point of a row of CTUs, in which when a reference CTU of a current row is completely entropy-encoded, entropy-encoding a first CTU in a next row may start based on context of the reference CTU, a number of bytes of the current row being indicated by an offset between entry points transmitted in the bitstream.

Another embodiment of the present invention provides a video decoding method including receiving a bitstream and performing parallel decoding based on the bitstream, wherein the bitstream comprises information specifying, in bytes, information to be subjected to parallel decoding.

The performing of the decoding may include entropy-decoding the bitstream and reconstructing a picture based on entropy-decoded information.

reconstructing a picture based on entropy-decoded information.

The performing of the decoding may entropy-decode a L-th CTU $CTU_{NL}$ in an N-th row of CTUs and then entropy-decode a first CTU $CTU_{N+11}$ in an (N+1)-th row of CTUs based on context of the $CTU_{ML}$, N and L being an integer, in which a number of bytes of the N-th row may be indicated by N-th offset information of information on offsets between entry points included in the bitstream.

That is, the bitstream may include offset information specifying an entry point of a row of CTUs to be subjected to parallel decoding, and the offset information may indicate a number of bytes between two entry points. The offset information may be transmitted via a slice header.

The performing of the decoding may start decoding at an access point indicated by an entry point of a row of CTUs, in which when a reference CTU of a current row is completely entropy-decoded, entropy-decoding a first CTU in a next row may start based on context of the reference CTU, a number of bytes of the current row being indicated by an offset between entry points transmitted in the bitstream.

Advantageous Effects

According to the present invention, encoded video information is effectively signaled, thereby improving coding efficiency.

Further, when parallel decoding is used, an entry point is set in bytes and signaled, thereby effectively utilizing data resources and increasing compression efficiency.

In addition, parallel decoding is carried out using a byte-aligned decoding unit, thereby remarkably enhancing video decoding efficiency.

DESCRIPTION OF DRAWINGS

FIG. 6 schematically illustrates a WPP substream.

MODE FOR INVENTION

Figure 1:
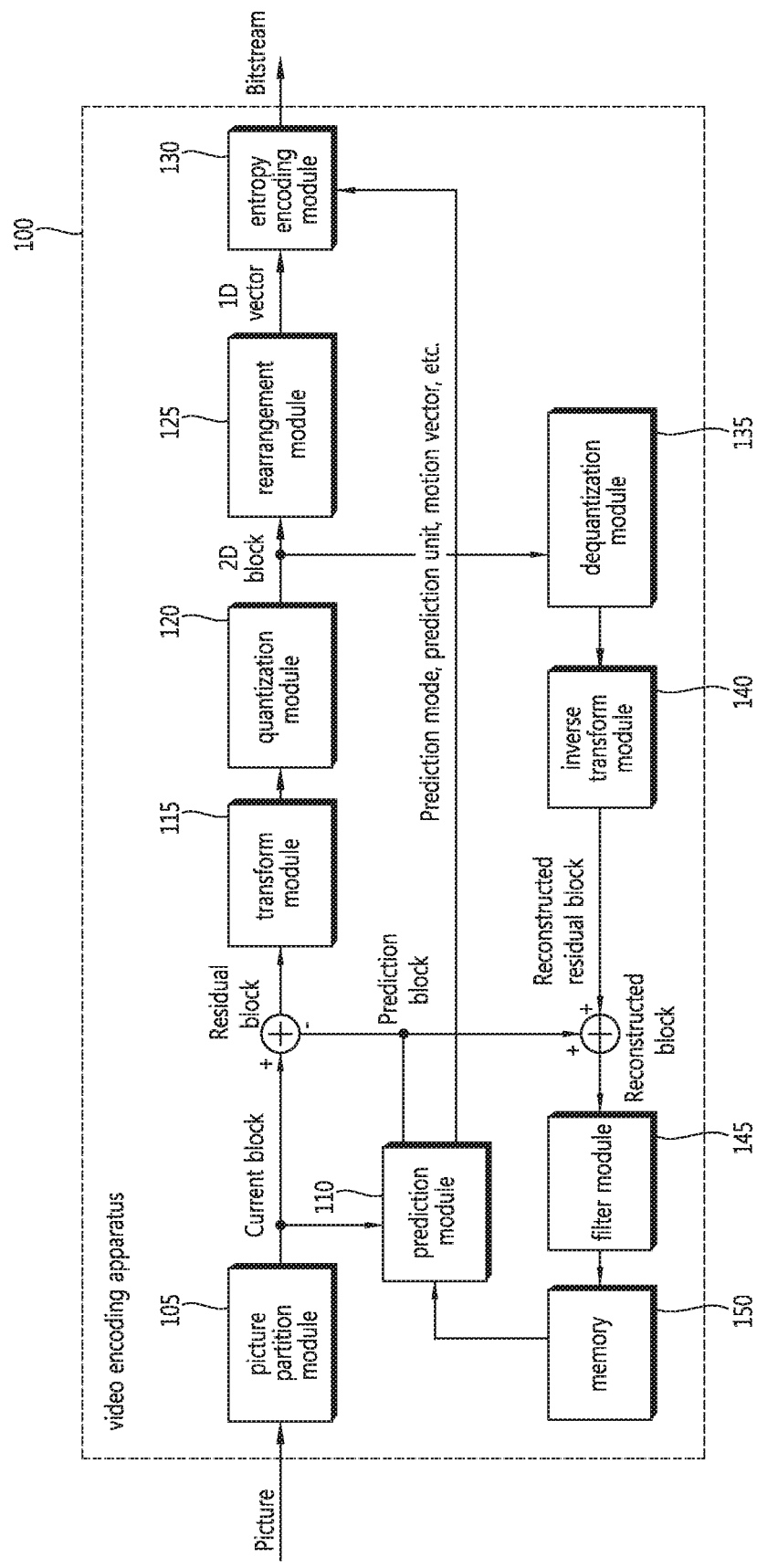
FIG. 1 is a block diagram schematically illustrating a video encoding apparatus according to an exemplary embodiment of the present invention.

The present invention may be changed and modified variously and be illustrated with reference to different exemplary embodiments, some of which will be described in detail and shown in the drawings. However, these embodiments are not intended for limiting the invention. The terminology used herein is for the purpose of describing particular embodiments only and is not intended to be limiting the technical idea of the invention. As used herein, the singular forms "a," "an" and "the" are intended to include the plural forms as well, unless the context clearly indicates otherwise. It will be further understood that the terms "include" and/or "have," when used in this specification, specify the presence of stated features, integers, steps, operations, elements, components, and/or combinations thereof, but do not preclude the presence or addition of one or more other features, integers, steps, operations, elements, components, and/or combinations thereof.

Although elements illustrated in the drawings are independently shown for convenience of description of different distinctive functions in a video encoding apparatus/decoding apparatus, such a configuration does not indicate that each element is constructed by a separate hardware constituent or software constituent. That is, at least two elements may be combined into a single element, or a single element may be divided into a plurality of elements to perform functions. It is to be noted that embodiments in which some elements are integrated into one combined element and/or an element is divided into multiple separate elements are included in the scope of the present invention without departing from the essence of the present invention.

Hereinafter, exemplary embodiments of the invention will be described in detail with reference to the accompanying drawings. Like reference numerals in the drawings refer to like elements throughout, and redundant descriptions of like elements will be omitted herein.

FIG. 1 is a block diagram schematically illustrating a video encoding apparatus according to an exemplary embodiment of the present invention. Referring to FIG. 1, the video encoding apparatus 100 includes a picture partition module 105, a prediction module 110, a transform module 115, a quantization module 120, a rearrangement module 125, an entropy encoding module 130, a dequantization module 135, an inverse transform module 140, a filter module 145 and a memory 150.

The picture partition module 105 may partition an input picture into at least one block as a processing unit. Here, the block as the processing unit may be a prediction unit (PU), a transform unit (TU) or a coding unit (CU).

Processing unit blocks partitioned by the picture partition module 105 may have a quadtree structure.

The prediction module 110 may include an inter prediction module to perform inter prediction and an intra prediction module to perform intra prediction, which will be described. The prediction module 110 performs prediction on the processing unit of the picture from the partition module 105 to generate a prediction block. The processing unit of the picture in the prediction module 110 may be a CU, a TU or a PU. Furthermore, the prediction module 110 may determine whether to perform inter prediction or intra prediction for the processing unit, and determine details (for example, a prediction mode) of each prediction method. Here, a processing unit for performing prediction may be different from a processing unit for determining a prediction method and details on the prediction method. For example, a prediction method and a prediction mode may be determined by each PU, while prediction may be performed by each TU.

In inter prediction, a prediction block may be generated by performing prediction based on information on at least one of previous and/or subsequent pictures of a current picture. In intra prediction, a prediction block may be generated by performing prediction based on information on a pixel within the current picture.

A skip mode, a merge mode and motion vector prediction (MVP) may be used as an inter prediction method. In inter prediction, a reference picture may be selected for a PU, and a reference block corresponding to the PU may be selected. The reference block may be selected as a unit of integer pixel. Subsequently, a prediction block that has a minimum residual signal with respect to the current PU and has a minimum-size motion vector is generated.

The prediction block may be generated as an integer sample unit or as a pixel unit smaller than an integer pixel, such as a ½ pixel unit and a ¼ pixel unit. Here, the motion vector may be also represented in a unit smaller than an integer pixel.

Information including an index of the reference pixel selected in inter prediction, the motion vector (e.g., a motion vector predictor) and the residual signal is entropy-encoded and transferred to a decoding apparatus. In the skip mode, since the prediction block may be a reconstructed block without a residual, the residual may not be generated, transformed, quantized and transferred.

In intra prediction, a prediction mode may be determined by a PU, and prediction may be performed by a PU. Alternatively, a prediction mode may be determined by a PU, and intra prediction may be performed by a TU.

Intra prediction may include 33 directional prediction modes and two or more non-directional modes. The non-directional modes may include a DC prediction mode and a planar mode.

In intra prediction, a prediction block may be generated after applying a filter to a reference sample. Here, it may be determined based on an intra prediction mode and/or size of a current block whether to apply the filter to the reference sample.

A PU may be a block of different sizes/forms. For example, in inter prediction, a PU may be a 2N×2N, 2N×N, N×2N or N×N block (N is an integer). In intra prediction, a PU may be a 2N×2N or N×N block (N is an integer). Here, a PU having an N×N size may be set to be applied only to a special case. For example, an N×N PU may be available only for a CU with a minimum size or only for intra prediction. In addition to the PUs with the foregoing sizes, a PU may include N×mN, mN×N, 2N×mN and mN×2N blocks (m<1).

A residual value (residual block or residual signal) between the generated prediction block and an original block is input to the transform module 115. Also, information on a prediction mode and a motion vector used for prediction are encoded along with the residual value by the entropy encoding module 130 and transmitted to the decoding apparatus.

The transform module 115 transforms the residual block by a transform block and generates a transform coefficient.

A transform block is a rectangular block of samples to which the same transformation is applied. The transform block may be a TU and have a quadtree structure.

The transform module 115 may perform transformation based on a prediction mode applied to the residual block and a size of the block.

For example, when intra prediction is applied to the residual block and the block has a 4×4 residual array, the transform module 115 may transform the residual block using discrete sine transform (DST). In other cases, the transform module 115 may transform the residual block using discrete cosine transform (DCT).

The transform module 115 may generate a transform block of transform coefficients by transformation.

The quantization module 120 may quantize residual values transformed by the transform module 115, that is, the transform coefficients, to generate quantized transform coefficients. The coefficients generated by the quantization module 120 are provided to the dequantization module 135 and the rearrangement module 125.

The rearrangement module 125 rearranges the quantized transform coefficients provided from the quantization module 120. Rearranging the quantized transform coefficients may enhance encoding efficiency in the entropy encoding module 130.

The rearrangement module 125 may rearrange a two-dimensional (2D) block of the quantized transform coefficients into a one-dimensional (1D) vector using coefficient scanning.

The entropy encoding module 130 may entropy-encode the quantized transform coefficients rearranged by the rearrangement module 125. Various encoding methods, such as exponential Golomb, context-adaptive variable length coding (CAVLC) and context-adaptive binary arithmetic coding (CABAC), may be used for entropy encoding. The entropy encoding module 130 may encode various types of information, such as quantized transform coefficient information and block type information on a CU, prediction mode information, partition unit information, ICU information, transfer unit information, motion vector information, reference picture information, block interpolation information and filtering information, received from the rearrangement module 125 and the prediction module 110.

Further, the entropy coding module 130 may apply a change to a received parameter set or syntax as necessary.

The dequantization module 135 dequantizes the values quantized by the quantization module 120, that is, the quantized transform coefficients, and the inverse transform module 140 inverse-transforms the values dequantized by the dequantization module 135.

The residual values generated through the dequantization module 135 and the inverse transform module 140 are added to the prediction block predicted by the prediction module 110, thereby generating a reconstructed block.

FIG. 1 illustrates that a reconstructed block is generated by adding a residual block to a prediction block through an adder. Here, the adder may be regarded as a separate module for generating a reconstructed block (reconstructed block generation module).

The filter module 145 may apply a deblocking filter, an adaptive loop filter (ALF), and a sample adaptive offset (SAO) to a reconstructed picture.

The deblocking filter may remove block distortion generated on boundaries between blocks in the reconstructed picture. The ALF may perform filtering based on a value resulting from comparing the reconstructed picture obtained by filtering blocks using the deblocking filter with the original picture. The ALF may be employed only for high efficiency. The SAO reconstructs an offset difference between the residual block to which the deblocking filter has been applied and the original picture by a pixel unit, in which a band offset or an edge offset is used.

Meanwhile, the filter module 145 may not apply filtering to a reconstructed block used in inter prediction.

The memory 150 may store the reconstructed block or picture obtained via the filter module 145. The reconstructed block or picture stored in the memory 150 may be provided to the prediction module 110 performing inter prediction.

Figure 2:
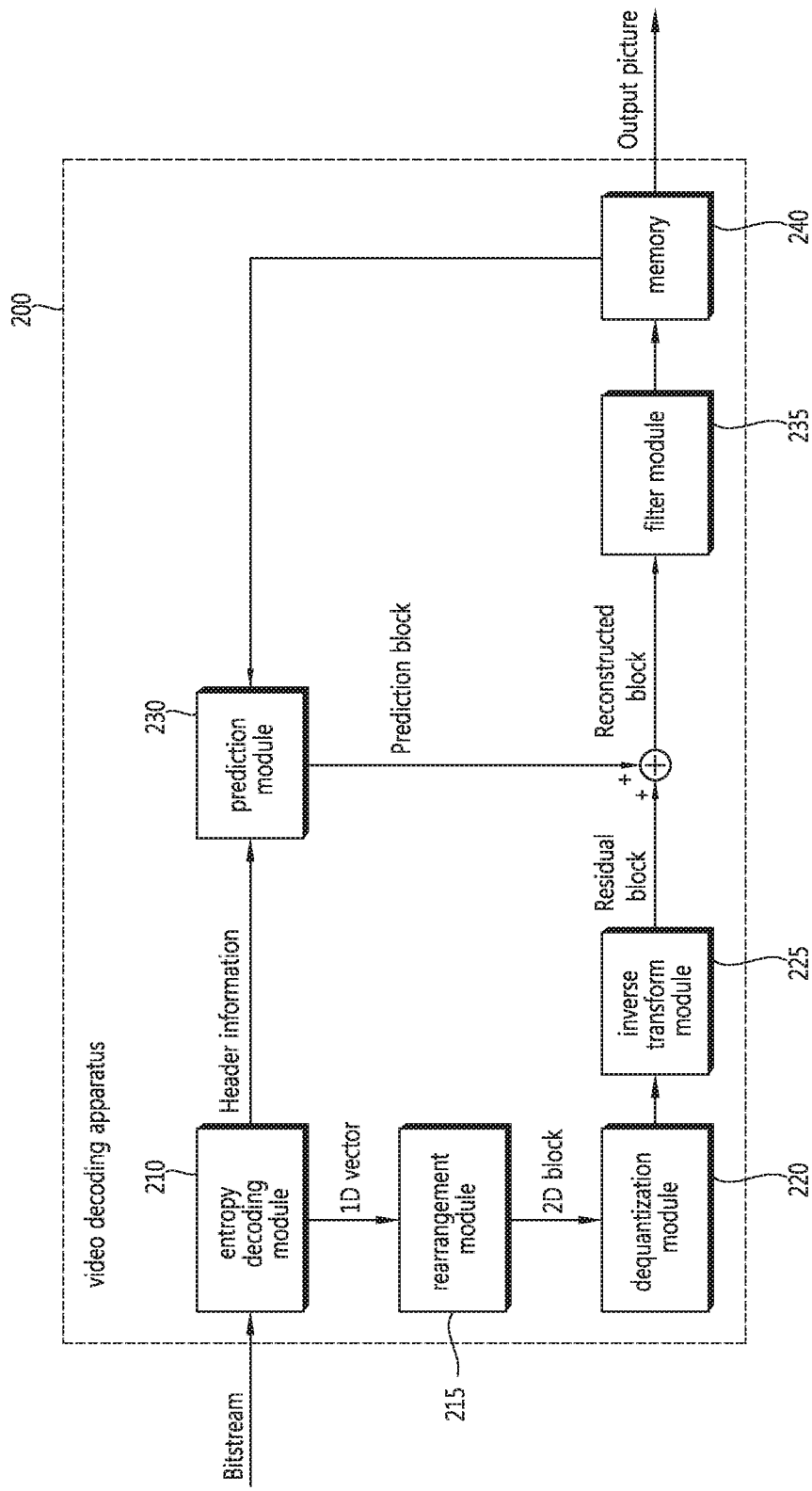
FIG. 2 is a block diagram schematically illustrating a video decoding apparatus according to an exemplary embodiment of the present invention.

FIG. 2 is a block diagram schematically illustrating a video decoding apparatus according to an exemplary embodiment of the present invention. Referring to FIG. 2, the video decoding apparatus 200 may include an entropy decoding module 210, a rearrangement module 215, a dequantization module 220, an inverse transform module 225, a prediction module 230, a filter module 235, and a memory 240.

When a video bitstream is input from the video encoding apparatus, the input bitstream may be decoded according to a procedure by which the video encoding apparatus processes video information.

For example, when the video encoding apparatus uses variable-length coding (VLC), such as CAVLC, to perform entropy encoding, the entropy decoding module 210 may perform entropy decoding using the same VLC table as used in the encoding apparatus. Also, if the video encoding apparatus uses CABAC to perform entropy ending, the entropy decoding module 210 may also perform entropy decoding using CABAC.

Among pieces of information decoded by the entropy decoding module 210, information for generating a prediction block may be provided to the prediction module 230, and a residual value entropy-decoded by the entropy decoding module 210, that is, a quantized transform coefficient, may be input to the rearrangement module 215.

The rearrangement module 215 may rearrange information on the bitstream entropy-decoded by the entropy decoding module 210, that is, the quantized transform coefficients, based on a rearrangement method used in the encoding apparatus.

The rearrangement module 215 may reconstruct and rearrange a 1D vector of coefficients into a 2D block of coefficients. The rearrangement module 215 may scan coefficients based on a prediction mode of a current block (transform block) and a size of the transform block to generate a 2D block of coefficients (quantized transform coefficients).

The dequantization module 220 may perform dequantization based on a quantization parameter provided from the encoding apparatus and the rearranged coefficients of the block.

The inverse transform module 225 may perform inverse DCT and/or inverse DST on a result of quantization performed by the video encoding apparatus in response to DCT and DST performed by the transform module of the encoding apparatus. Inverse transformation may be performed on the basis of a transfer unit or a picture partition unit determined by the encoding apparatus. The transform module of the encoding apparatus may selectively perform DCT and/or DST depending on a plurality of information elements, such as a prediction method, a size of a current block and a prediction direction, and the inverse transform module 225 of the decoding apparatus may perform inverse transformation on the basis of information on transformation performed by the transform module of the encoding apparatus.

The prediction module 230 may generate a prediction block based on information relating to generation of the prediction block provided from the entropy decoding module 210 and information on a previously decoded block and/or picture provided from the memory 240.

If a prediction mode for a current PU is an intra prediction mode, intra prediction may be performed based on information on a pixel in a current picture to generate the prediction block.

If the prediction mode for the current PU is an inter prediction mode, inter prediction for the current PU may be performed based on information on at least one of previous and subsequent pictures of the current picture. Here, motion information necessary for the inter prediction for the current PU provided by the video encoding apparatus, for example, information on a motion vector and a reference picture index, may be derived by checking a skip flag and a merge flag received from the encoding apparatus.

A reconstructed block may be generated using the prediction block generated by the prediction module 230 and a residual block provided by the inverse transform module 225. FIG. 2 illustrates that the adder merges the prediction block and the residual block to generate the reconstructed block. Here, the adder may be regarded as a separate module for generating the reconstructed block (reconstructed block generation module).

When the skip mode is used, the prediction block may be the reconstructed block without transmitting the residual block.

The reconstructed block and/or picture may be provided to the filter module 235. The filter module 235 may apply deblocking filtering, SAO and/or AFL to the reconstructed block and/or picture.

The memory 240 may store the reconstructed picture or block to be used as a reference picture or a reference block and supply the reconstructed picture to an output unit.

Meanwhile, the encoding apparatus and the decoding apparatus may partition a picture into predetermined units to process (encode/decode) the units.

For example, a picture may be partitioned into slices and tiles.

A slice is a sequence of one or more slice segments. A slice sequence includes one independent slice segment and subsequent dependent slice segments that follows the independent slice segment before a next independent slice segment.

A slice segment may be a sequence of coding tree units (CTUs) or coding tree blocks (CTBs). A CTU is CUs of a quadtree, which may be a largest coding unit (LCU). In this specification, a CTU and LCU may be replaced with each other as necessary for better understanding.

Figure 3:
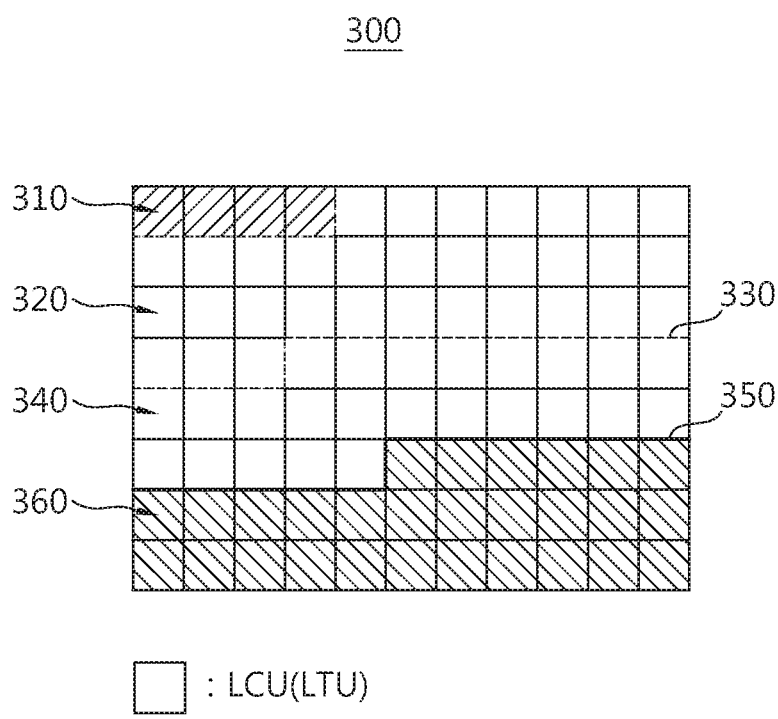
FIG. 3 schematically illustrates a slice according to an exemplary embodiment.

FIG. 3 schematically illustrates a slice according to an exemplary embodiment.

A current picture 300 is divided into two slices by a slice boundary 350. A first slice may include an independent slice segment 310 including four CTUs, a first dependent slice segment 320 including 32 CTUs and a second dependent slice segment 340 including 24 CTUs, the first dependent slice segment 320 and the second dependent slice segment being divided by a slice segment boundary 330.

Another independent slice segment 360 includes 28 CTUs.

A tile may be also a sequence of CTUs, CTBs or LCUs. A CTU is CUs of a quadtree, which may be an LCU. As described above, in this specification, a CTU and LCU may be replaced with each other as necessary for better understanding.

In detail, a tile may be an integer number of CTUs or LCUs co-occurring within a region specified by one row or one column.

With respect to each slice and each tile, all or at least one of the following two conditions are satisfied: (1) all CTUs or LCUs in a slice belong to the same tile; and (2) all CTUs or LCUs in a tile belong to the same slice.

Thus, slices including a plurality of tiles and a tile including a plurality of slices may be present within the same picture.

Further, with respect to each slice segment and each tile, all or at least one of the following two conditions are satisfied: (1) all CTUs or LCUs in a slice segment belong to the same tile; and (2) all CTUs or LCUs in a tile belong to the same slice segment.

Figure 4:
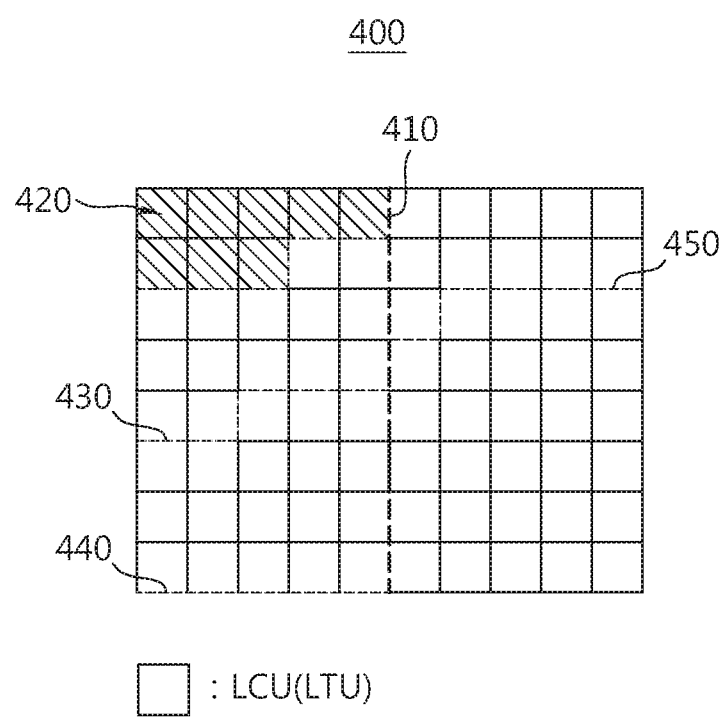
FIG. 4 schematically illustrates a tile and a slice according to an exemplary embodiment.

FIG. 4 schematically illustrates a tile and a slice according to an exemplary embodiment.

A current picture 400 includes only a single slice and is divided into two right and left tiles based on a tile boundary 410. The slice in the current picture 400 includes an independent slice segment 420 and four dependent slice segments divided by slice segment boundaries 430, 440 and 450.

Figure 5:
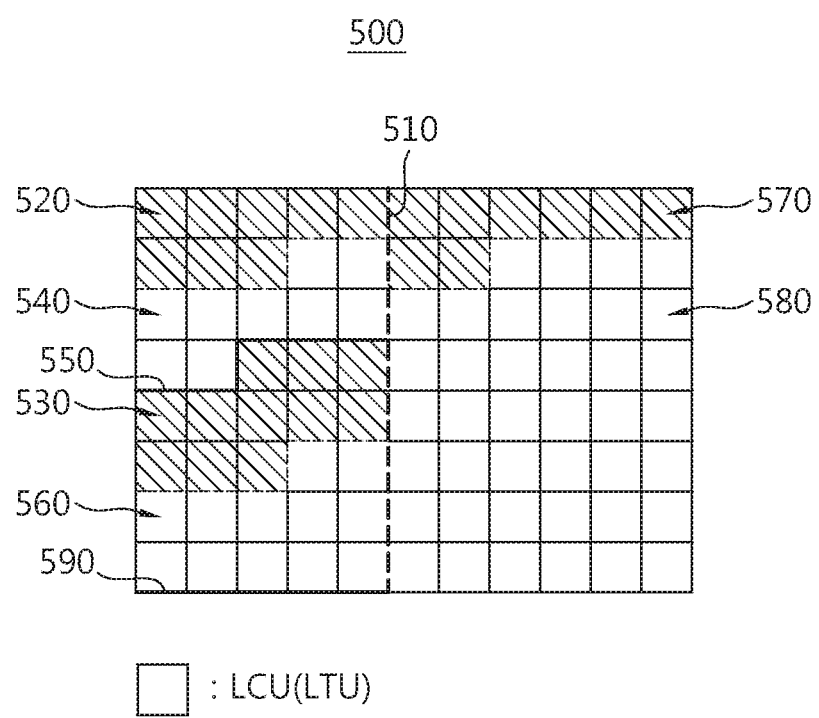
FIG. 5 schematically illustrates a tile and a slice according to another exemplary embodiment.

FIG. 5 schematically illustrates a tile and a slice according to another exemplary embodiment.

A current picture 500 is divided into two right and left tiles based on a tile boundary 510. The left tile on the tile boundary 510 includes two slices based on a slice boundary 550. An upper slice on the slice boundary 550 includes an independent slice segment 520 and a dependent slice segment 540, while a lower slice on the slice boundary 550 includes an independent slice segment 530 and a dependent slice segment 560. A next slice based on a slice boundary 590, that is, a slice in a second tile, includes an independent slice segment 570 and a dependent slice segment 580.

Encoding and decoding may be performed by a tile, a row of CTUs (hereinafter, a row or stream of CTUs or a row or stream of LCTs is referred to as a "substream" for convenience of description). Each sample in a tile or substream may be processed by a CTU or LCU.

Here, decoding may be performed in parallel. For example, decoding may be performed in parallel by tiles. Alternatively, decoding may be performed in parallel by substreams.

For instance, when entropy decoding is carried out by substreams, when entropy-decoding of an $n^{th}$ substream (n is an integer) starts, after a second CTU or LCU of the $n^{th}$ substream is entropy-decoded, then an $n+1^{th}$ substream may be entropy-decoded.

A substream may be part of a bitstream to be decoded in each decoding process when a plurality of decoding processes are performed in parallel, which may be a row of LCUs or CTUs.

Here, when the second CTU or LCU of the $n^{th}$ substream (an $n^{th}$ row of CTUs or LCUs) is completely entropy-decoded, related context information is stored. A first CTU or LCU of the $n+1^{th}$ substream may be entropy-decoded based on the context information on the second CTU or LCU of the $n^{th}$ substream.

As such, parsing substreams in parallel at an interval of one CTU or LCU is defined as wavefront parallel processing (WPP).

Unlike in WPP, tiles may be simultaneously decoded in a tile structure. Here, a maximum number of tiles to be processed in parallel may be predetermined. For example, at most four tiles may be set to be processed in parallel. When the number of tiles to be processed in parallel is four or fewer, the decoding apparatus may process one to four tiles at once.

The tile structure and WPP enable the encoding apparatus to partition a picture into a plurality of sections. The decoding apparatus may decode the partitioned sections in a parallel manner.

An access point of a bitstream for performing parallel decoding using the tile structure (tile substream) or WPP substream is defined as an entry point. For example, an entry point may be a start point of each WPP substream or each tile of a bitstream to be subjected to parallel processing.

Thus, to allow parallel processing, it is important to signal an entry point of each tile or entry point of a slice header of a WPP substream. Although a tile and WPP may employ different encoding/decoding techniques, an entry point of a tile and an entry point of a substream applied WPP may be signaled in the same manner.

In parallel processing, a tile always starts at a byte aligned location, whereas a substream applied WPP ("WPP substream") may not start at a byte aligned location. Byte alignment means alignment in bytes.

Since a tile and a WPP substream are different in bit granularity with respect to an entry point, it may be important to know whether a length of a partition, that is, a WPP substream of a tile, is signaled based on a byte, bits or bytes.

FIG. 6 schematically illustrates a WPP substream.

In FIG. 6, a predetermined region 600 of a picture includes a plurality of substreams, such as substream A 610, substream B 620 and substream C 630.

Each substream is sequentially decoded from a first LCU. Second and subsequent LCUs of each substream may be entropy-decoded based on results of entropy decoding previous LCUs, that is, context.

In WPP, substreams may be decoded in parallel, in which first LCUs of substreams subsequent to a first substream may be entropy-decoded based on values of context variables with respect to second LCUs of previous substreams.

For example, in parallel decoding using WPP, decoding is carried out from a first LCU A1 of a first row 610 in a decoding target region 600. When a second LCU A2 of the first row 610 is completely entropy-decoded, the decoding apparatus stores values of context variables with respect to A2.

A first LCU B1 of a second row 620 is entropy-decoded based on the values of the context variables with respect to the second LCU A2 of the first row 610. When a second LCU B2 of the second row 620 is completely entropy-decoded, the decoding apparatus stores values of context variables with respect to B2.

A first LCU C1 of a third row 630 is entropy-decoded based on the values of the context variables with respect to the second LCU B2 of the second row 620. When a second LCU C2 of the third row 630 is completely entropy-decoded, the decoding apparatus stores values of context variables with respect to C2.

Likewise, fourth and subsequent rows may be subjected to entropy decoding using values of context variables with respect to second LCUs of previous rows.

When WPP is employed, an entry point may indicate a decoding start point (access point) of each substream.

In FIG. 6, the predetermined region 600 of the picture may be part of the current picture, a slice of the current picture or an entire region of the current picture.

Figure 7:
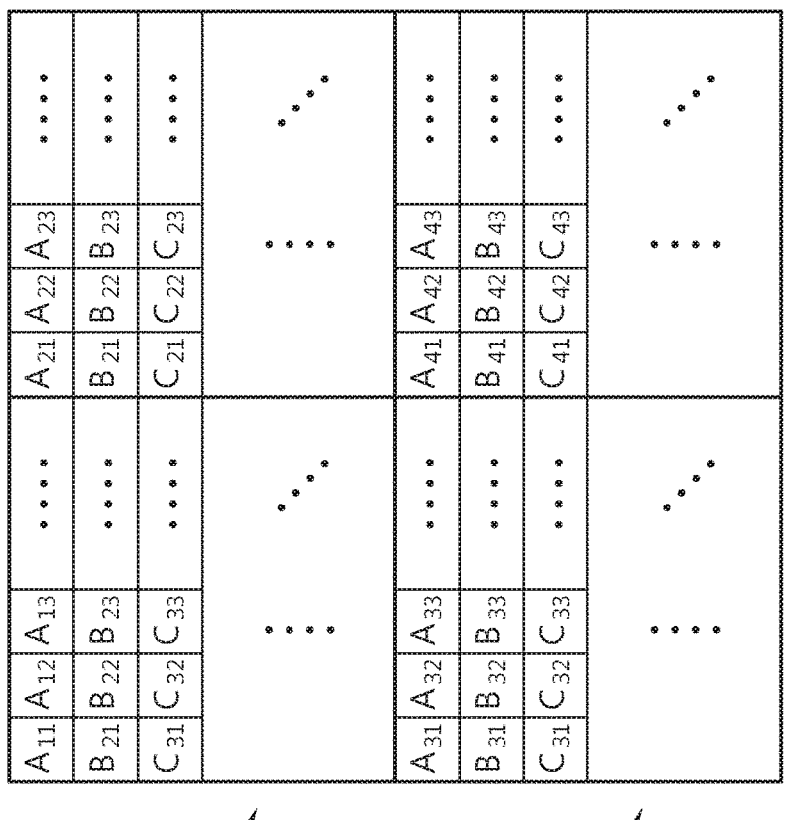
FIG. 7 schematically illustrates a tile.

FIG. 7 schematically illustrates a tile.

In FIG. 7, a predetermined region 700 of a picture is divided into tile 1 710, tile 2 720, tile 3 730 and tile 4 740. Each tile includes a plurality of substreams.

When the tile structure is employed, the decoding apparatus may decode the tiles in parallel. As illustrated above, when a maximum number of tiles to be decoded in parallel is 4, the decoding apparatus may decode tiles 1 to 4 at the same time.

In decoding the tiles in parallel, substreams are decoded in order from a first substream of each tile, for example, A→B→C→ etc., in which ICUs in a substream are decoded in order from a first LCU, for example, Xx1→Xx2→Xx3→, etc.

When the tile structure is applied, entry points may indicate decoding start points access points) of the respective tiles.

In FIG. 7, the predetermined region 700 of the picture may be part of the current picture, a slice of the current picture or an entire region of the current picture.

Meanwhile, both WPP and tiles may be applied.

Figure 8:
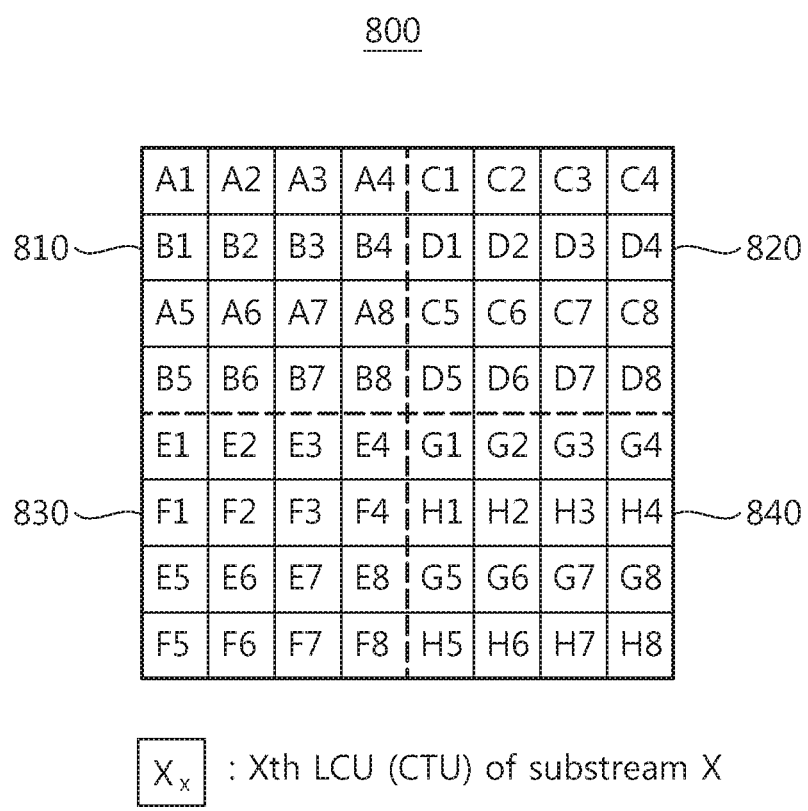
FIG. 8 schematically illustrates a relationship between WPP and a tile.

FIG. 8 schematically illustrates a relationship between WPP and tiles.

When both WPP and tiles are employed, a WPP substream is applied in a tile as illustrated in FIG. 8.

In FIG. 8, a predetermined region 800 of a picture is divided into tile 1 810, tile 2 820, tile 3 830 and tile 4 840. Each tile includes a plurality of substreams.

As shown in FIG. 8, substreams A and B are alternately disposed in tile 1 810, substreams C and D are alternately disposed in tile 2 820, substreams E and F are alternatively disposed in tile 3 830, substreams G and H are alternatively disposed in tile 4 840.

Thus, considering application of tiles and WPP, content indicated by signaled entry points may need to be specified separately when neither a tile nor WPP is used, when a tile is used, when WPP is used and when both a tile and WPP are used. For example, types of entry points may be specified as follows.

(i) If neither a tile nor WPP is used, no entry point is present.

(ii) If a tile is used and WPP is not used, all entry points are entry points of the tile.

(iii) If a tile is not used and WPP is used, all entry points are entry points of a WPP substream.

(iv) If both a tile and WPP are used, an i-th entry point is an entry point of both a tile and a WPP substream when an i % number of WPP substreams is 0 while the i-th entry point is an entry point of a WPP substream when the i % number of WPP substreams is not 0.

In FIG. 8, the predetermined region 800 of the picture may be part of the current picture, a slice of the current picture or an entire region of the current picture.

As described above, in parallel decoding, a start point (access point) of each parallel processing in indicated by an entry point. Thus, various methods of signaling an entry point for the encoding apparatus and various methods of receiving a signaled entry point and performing parallel decoding for the decoding apparatus may be considered.

Hereinafter, signaling of entry point information will be described in detail with reference to exemplary embodiments.

Embodiment 1

Table 1 illustrates a syntax element in a slice header used to signal entry points of a WPP substream and a tile.

TABLE 1

|  | Descriptor |
|---|---|
| slice_header( ) { | |
| ... | |
|   entry_point_locations_flag | u(1) |
|   if entry_point_locations_flag == 1) { | |
|     entry_point_locations ( ) | |
|   } | |
| } | |

In Table 1, entry point information may be information on an entry point of a WPP substream or information on an entry point of a tile.

entry_point_location_flag specifies whether entry point information is present in a bitstream. For example, if the entry point information, for instance, entry point location information, is present in the bitstream, entry_point_location_flag is 1. If the entry point information is absent in the bitstream, entry_point_location_flag is 0.

Table 2 illustrates a syntax structure relating to the entry point location information in Table 1.

TABLE 2

|  | Descriptor |
|---|---|
| entry_point_locations( ) | |
| { | |
|   num_of_entry_points_minus1 | ue(v) |
|   entry_point_offset_length_minus2 | ue(v) |
|   for (i=0; i<num_of_entry_points_minus1; i++) { | |
|     entry_point_offset[i] | u(v) |
|   } | |
| } | |

In Table 2, the entry point information may be information on an entry point of a WPP substream or information on an entry point of a tile.

num_of_entry_points_minus1 specifies a number of entry points in the bitstream in a slice. Since a number of entry point offsets is smaller by 1 than the number of entry points, num_of_entry_points_minus1 may also specify a number of syntax elements entry_point_offset[i] in the slice header.

entry_point_offset_length_minus2 specifies a number of bits used to signal information on an entry point offset (syntax element entry_point_offset). That is, entry_point_offset_length_minus2 may specify a length of syntax element entry_point_offset[i] in bits or bytes.

entry_point_offset[i] specifies a number of bits between two entry points. Here, when i is 0, entry_point_offset[0] specifies a number of bits between an end of the slice header and a first entry point in a slice. When i is not 0, entry_point_offset[i] specifies a number of bits between an entry point i−1 and an entry point i.

If the length of entry_point_offset[i] is xx, xx may be defined as Equation 1.

$$xx = (\text{num\_substreams\_minus1} > 0)?\text{entry\_point\_offset\_length\_minus2} + 5 : \text{entry\_point\_offset\_length\_minus2} + 2 \quad \text{[Equation 1]}$$

In Equation 1, WPP may be employed when a number of substreams is greater than 1, while a tile may be used when the number of substreams is 1 or smaller.

In this case, an entry point type, that is, whether an entry point is about a tile or about a WPP substream, may be inferred as follows.

(1) If tile_info_present_flag is 1 and num_substream_minus1 is 0, that is, tile_info_present_flag==1 && num_substream_minus1==0, all entry points are entry points of tiles. That is, if tile information is present and the number of substreams is 1, all entry points may be inferred as entry points of tiles.

(2) If tile_info_present_flag is 0 and num_substream_minus1 is greater than 0, that is, tile_info_present_flag==0 && num_substream_minus1>0, all entry points are entry points of WPP substreams. That is, if tile information is absent and a plurality of substreams is present, all entry points may be inferred as entry points of WPP substreams.

(3) If tile_info_present_flag is 1 and num_substream_minus1 is greater than 0, that is, tile_info_present_flag==1 && num_substream_minus1>0, when i is not 0 (i!=0) and (i+1) %(num_substream1+1)==0, an i-th entry point is an entry point of a tile that is an i-th entry point. Otherwise, entry points are entry points of WPP substreams, That is, if tile information is present and a plurality of substreams is present, entry points may be inferred as entry points of WPP substreams or entry points of tiles and WPP substreams.

Embodiment 2

When WPP is employed, a stream (for example, a bitstream) of encoded data in a slice may be partitioned into one or more substreams.

A substream may be a unit of parallel processing (parallel decoding), and each substream is aligned in bits. In this specification, "aligning/aligned in bits" is expressed as "bit-aligning/aligned" for convenience of description.

Thus, a length of each substream may be expressed in bits, and an entry point thereof may be also expressed in bits.

Figure 9:
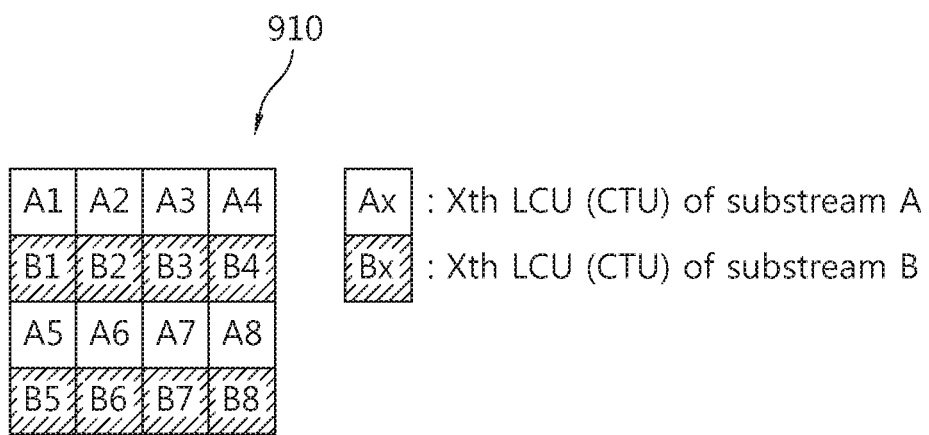
FIG. 9 schematically illustrates order of largest coding units (LCUs) in a picture according to an exemplary embodiment.

FIG. 9 schematically illustrates order of LCUs in a picture.

Referring to FIG. 9, a predetermined region 910 of a picture includes two substreams which are substream A as a 0-th substream and substream B as a first substream. Substream A includes LCUs Ax (x=1, 2, . . . , 7 and 8) and substream B includes LCUs Bx (x=1, 2, . . . , 7 and 8).

In FIG. 9, substreams A and B are alternately disposed in the region 910.

The region 910 of the picture may be part of the current picture, a slice or tile of the current picture, an entire region of the current picture. An LCU may be a CTU.

Figure 10:
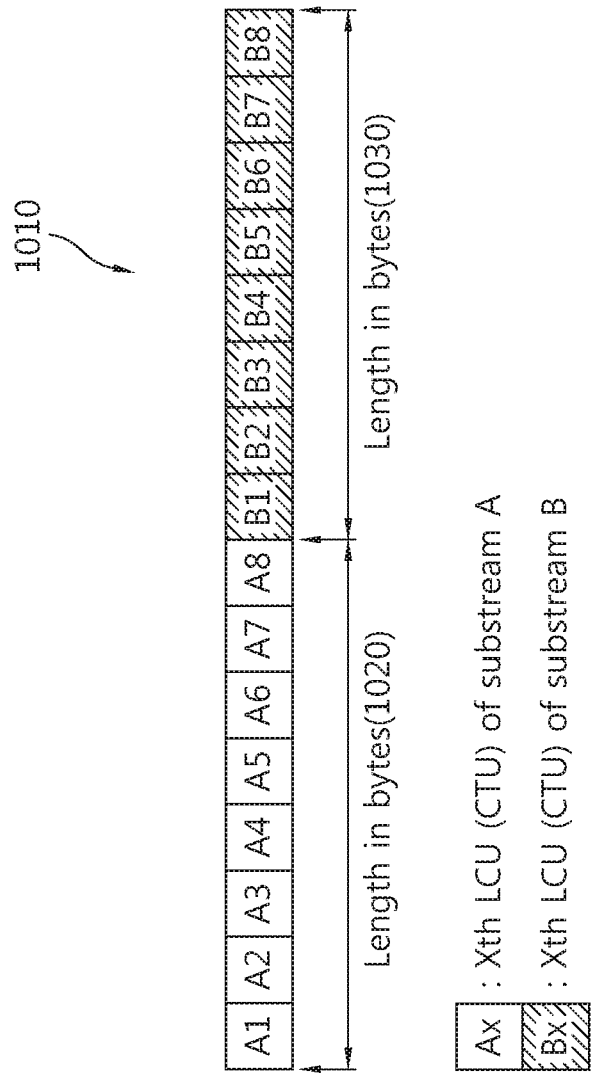
FIG. 10 schematically illustrates order of LCUs in a bitstream according to an exemplary embodiment.

FIG. 10 schematically illustrates order of LCUs in a bitstream. In FIG. 10, the bitstream is formed of the LCUs illustrated in FIG. 9.

Referring to FIG. 10, the bitstream 1010 includes two substreams which are substream A as a 0-th substream and substream B as a first substream. Substream A includes LCUs Ax (x=1, 2, . . . , 7 and 8) and substream B includes LCUs Bx (x=1, 2, . . . , 7 and 8).

In the bitstream 1010, an entry point 1020 of substream A may correspond to a start point of LCU A1, and an entry point 1030 of substream B may correspond to a start point of LCU B1.

In FIG. 9, when the region 910 is a tile and a tile structure is employed instead of WPP, the entry point 1030 may be an entry point of the tile.

As described above, the substreams of FIG. 10 have a length in bits, and the entry points are expressed in bits.

In this connection, aligning a substream in bytes, not in bits, may be considered. In this specification, "aligning/aligned in bytes" is expressed as "byte-aligning/aligned" for convenience of description.

Thus, WPP substreams are byte-aligned when WPP is employed, while substreams in a tile may be byte-aligned when the tile structure is employed.

Byte-aligned bits may be used to byte-align substreams. A byte-aligned bit is a bit to be added to a bitstream or substream so as to byte-align each substream.

For instance, when each stream (WPP substream or substream of a tile) is not byte-aligned at an end thereof, a byte-aligned bit may be added. Thus, a length of each substream is expressed in bytes, not in bits.

A byte-aligned bit may be added to a predetermined section of a substream to be subjected to byte alignment. For example, a byte-aligned bit may be added to an end of each substream.

Figure 11:
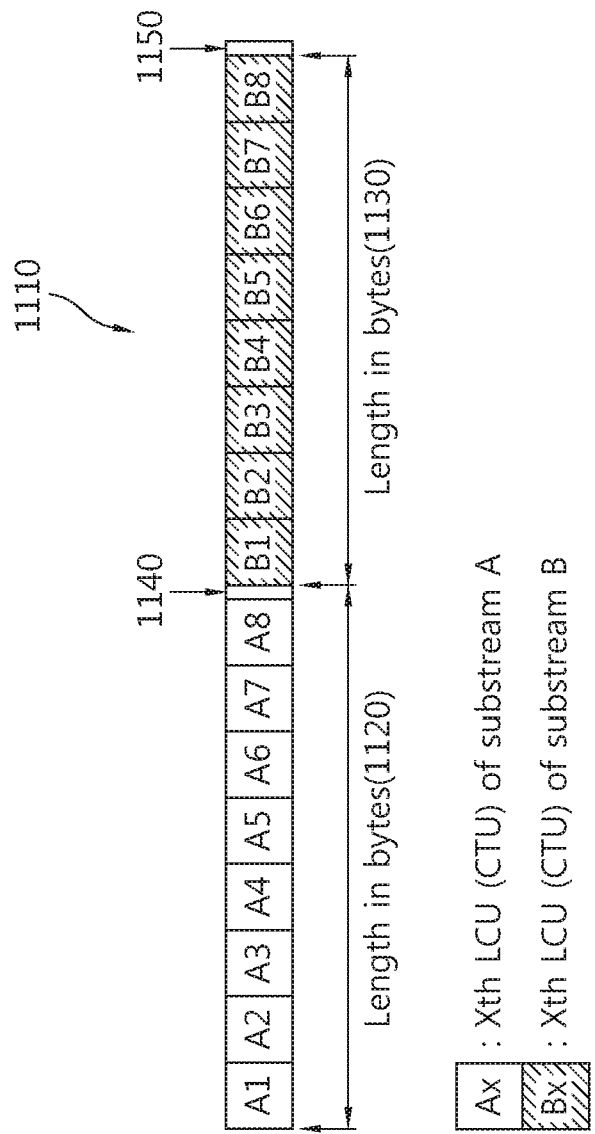
FIG. 11 schematically illustrates byte alignment of a substream according to an exemplary embodiment.

FIG. 11 schematically illustrates byte alignment of a substream.

In FIG. 11, the bitstream is formed of the LCUs illustrated in FIG. 9.

Referring to FIG. 11, the bitstream 1110 includes two substreams which are substream A as a 0-th substream and substream B as a first substream. Substream A includes LCUs Ax (x=1, 2, . . . , 7 and 8) and substream. B includes LCUs Bx (x=1, 2, . . . , 7 and 8).

In the bitstream 1110, an entry point 1120 of substream A may correspond to a start point of LCU A1, and an entry point 1130 of substream B may correspond to a start point of LCU B1.

In FIG. 9, when the region 910 is a tile and the tile structure is employed instead of WPP, the entry point 1130 may be an entry point of the tile.

When a length of substream A is not in bytes, a byte-aligned bit 1140 may be added at an end of substream A, thereby expressing substream A in bytes.

When a length of substream B is not in bytes, a byte-aligned bit 1150 may be added at an end of substream B, thereby expressing substream B in bytes.

When a substream is byte-aligned and both a tile and a WPP substream are possibly expressed in a byte level, an entry point may be signaled in a simpler manner with granularities of entry points of the tile and WPP substream being the same.

Table 3 illustrates a syntax element in a slice header used to signal entry points of a WPP substream and a tile.

TABLE 3

| | Descriptor |
|---|---|
| slice_header( ) { | |
| ... | |
|   entry_point_locations_flag | u(1) |
|   if (entry_point_locations_flag == 1) { | |
|     entry_point_locations ( ) | |
|   } | |
| } | |

In Table 3, entry point information may be information on an entry point of a WPP substream or information on an entry point of a tile.

entry_point_location_flag specifies whether entry point information is present in a bitstream. For example, if the entry point information, for instance, entry point location information, is present in the bitstream, entry_point_location_flag is 1. If the entry point information is absent in the bitstream, entry_point_location_flag is 0.

Table 4 illustrates a syntax structure relating to the entry point location information in Table 3.

TABLE 4

| | Descriptor |
|---|---|
| entry_point_locations( ) | |
| { | |
|   num_of_entry_points_minus1 | ue(v) |
|   entry_point_offset_length_minus2 | ue(v) |
|   for (i=0; i<=num_of_entry_points_minus1; i++) { | |
|     entry_point_offset[i] | u(v) |
|   } | |
| } | |

In Table 4, the entry point information may be information on an entry point of a WPP substream or information on an entry point of a tile.

num_of_entry_points_minus1 specifies a number of entry points in the bitstream in a slice. Since a number of entry point offsets is smaller by 1 than the number of entry points, num_of_entry_points_minus1 may also specify a number of syntax elements entry_point_offset[i] in the slice header.

entry_point_offset_length_minus2 specifies a number of bits used to signal information on an entry point offset (syntax element entry_point_offset). That is, entry_point_offset_length_minus2 may specify a length of syntax element entry_point_offset[i] in bits or bytes.

entry_point_offset[i] specifies a number of bytes between two entry points.

When i is 0, entry_point_offset[i] specifies a number of bytes between an end of the slice header and a first entry point in a slice. Here, to byte-align the end of the slice header, some initial bits of a first tile/WPP substream may be added to the end of the slice header. The added bits serve as byte-aligned bits.

When i is not 0, entry_point_offset[i] specifies a number of bytes between an entry point i−1 and an entry point i.

Here, a length of entry_point_offset[i] is entry_point_offset_length_minus2+2.

An entry point type, that is, whether an entry point is about a tile or about a WPP substream, may be inferred as follows.

(1) If tile_info_present_flag is 1 and num_substream_minus1 is 0, that is, tile_info_present_flag==1 && num_substream_minus1==0, all entry points are entry points of tiles. That is, if tile information is present and the number of substreams is 1, all entry points may be inferred as entry points of tiles.

(2) If tile_info_present_flag is 0 and num_substream_minus1 is greater than 0, that is, tile_info_present_flag==0 && num_substream_minus1>0, all entry points are entry points of WPP substreams. That is, if tile information is absent and a plurality of substreams is present, all entry points may be inferred as entry points of WPP substreams.

(3) If tile_info_present_flag is 1 and num_substream_minus1 is greater than 0, that is, tile_info_present_flag==1 && num_substream_minus1>0, when i is not 0 (i!=0) and (i+1)%(num_substream1+1)==0, an i-th entry point is an entry point of a tile that is an i-th entry point. Otherwise, entry points are entry points of WPP substreams. That is, if tile information is present and a plurality of substreams is present, entry points may be inferred as entry points of WPP substreams or entry points of tiles and WPP substreams.

Embodiment 3

When parallel processing is employed, only an entry point of a WPP substream among substreams may be signaled. For example, when only WPP is employed instead of using WPP and the tile structure in combination, an entry point of a WPP substream may be signaled.

Information on the entry point of the WPP substream may be also signaled in a slice header.

Table 5 illustrates a syntax in the slice header used to signal the information on the entry point of the WPP substream.

TABLE 5

| | Descriptor |
|---|---|
| slice_header( ) { | |
| ... | |
| if (num_substreams_minus1 > 0) | |
| { | |
|   log2_max_substream_length_minus2 | ue(v) |
|   for (i = 0; i < num_substreams_minus1; i++) | |
|   { | |
|     substream_length [i] | u(v) |
|   } | |
| } | |
| ... | |
| } | |

In Table 5, log2_max_substream_length_minus2 specifies a number of bits used to signal information on a length of the substream, substream_length[i].

substream_length[i] specifies a number of bits between two entry points. Here, the two entry points may be about the WPP substream.

When i is 0 substream_length[i] specifies a number of bits between an end of the slice header and a first entry point in a slice. When i is not 0, substream_length[i] specifies a number of bits between an entry point i−1 and an entry point i.

Further, as in Embodiment 2, the length of the substream may be expressed in bytes. In this case, substream_length[i] specifies a number of bytes between two WPP-substream entry points.

Although the present embodiment illustrates that the information on the length of the substream is transmitted considering that only the entry point of the WPP substream is transmitted, an entry point offset may be also transmitted as in Embodiments 1 and 2, instead of the length of the substream.

In this case, the slice header in Table 5 transmits entry_point_offset[i] instead of substream_length[i]. entry_point_offset[i] specifies a number of bytes or bits between two entry points, in which a byte-aligned bit for byte-aligning the substream may be used if the number of bytes is specified.

Embodiment 4

Unlike in the foregoing embodiments, an entry point type, that is, whether an entry point is about a tile or about a WPP substream, may be directly signaled, instead of being inferred.

Table 6 illustrates a syntax in a slice header used to signal information on an entry point.

TABLE 6

| | Descriptor |
|---|---|
| slice_header( ) { | |
| ... | |
| entry_point_locations_flag | u(1) |
| if (entry_point_locations_flag == 1) { | |
|   entry_point_locations ( ) | |
| } | |
| } | |

In Table 6, entry_point_location_flag specifies whether entry point information is present in a bitstream. For example, if the entry point information, for instance, entry point location information, is present in the bitstream, entry_point_location_flag is 1. If the entry point information is absent in the bitstream, entry_point_location_flag is 0.

Table 7 illustrates a syntax relating to the entry point location information in Table 6.

TABLE 7

| entry_point_locations( ) | Descriptor |
|---|---|
| { | |
|   num_of_entry_points_minus1 | ue(v) |
|   entry_point_offset_length_minus2 | ue(v) |
|   for (i=0; i<num_of_entry_points_minus1; i++) { | |
|     entry_point_type[i] | u(1) |
|     entry_point_offset[i] | u(v) |
|   } | |
| } | | num_of_entry_points_minus1 specifies a number of entry points in the bitstream in a slice. Since a number of entry point offsets is smaller by 1 than the number of entry points, num_of_entry_points_minus1 may also specify a number of syntax elements entry_point_offset[i] in the slice header.

entry_point_offset_length_minus2 specifies a number of bits used to signal information on an entry point offset (syntax element entry_point_offset). That is, entry_point_offset_length_minus2 may represent a length of syntax element entry_point_offset[i] in bits or bytes.

entry_point_type[i] specifies an entry point type. For instance, entry_point_type[i] equal to 1 specifies an entry point of a WPP substream, and entry_point_type[i] equal to 0 specifies an entry point of both a tile and a WPP substream.

entry_point_offset[i] specifies a number of bits or bytes between two entry points. When i is 0, entry_point_offset[0] specifies a number of bits or bytes between an end of the slice header and a first entry point in a slice. When i is not 0, entry_point_offset[i] specifies a number of bits or bytes between an entry point i−1 and an entry point i.

When entry_point_offset[i] specifies a number of bytes between two entry points, a byte-aligned bit for byte-alignment may be used.

If the length of entry_point_offset[i] is xx, xx may be defined as Equation 2.

$$xx=(num\_substreams\_minus1>0)?entry\_point\_offset\_length\_minus2+5:entry\_point\_offset\_length\_minus2+2 \quad \text{[Equation 2]}$$

In Equation 2, WPP may be employed when a number of substreams is greater than 1, while a tile may be used when the number of substreams is 1 or smaller.

Embodiment 5

Information on a length of an entry point offset may be signaled in a different manner from in Embodiment 1.

Table 8 illustrates a syntax element in a slice header used to signal entry points of a WPP substream and a tile.

TABLE 8

| slice header( ) { | Descriptor |
|---|---|
| ... | |
|   entry_point_locations_flag | u(1) |
|   if (entry_point_locations_flag == 1) { | |
|     entry_point_locations ( ) | |
|   } | |
| } | |

In Table 8, entry point information may be information on an entry point of a WPP substream or information on an entry point of a tile.

entry_point_location_flag specifies whether entry point information is present in a bitstream. For example, if the entry point information, for instance, entry point location information, is present in the bitstream, entry_point_location_flag is 1. If the entry point information is absent in the bitstream, entry_point_location_flag is 0.

Table 9 illustrates a syntax structure relating to the entry point location information in Table 8.

TABLE 9

| entry_point_locations( ) | Descriptor |
|---|---|
| { | |
|   num_of_entry_points_minus1 | ue(v) |
|   entry_point_offset_length_minus1 | ue(v) |
|   for (i=0; i<num_of_entry_points_minus1; i++) { | |
|     entry_point_type[i] | u(1) |
|     entry_point_offset[i] | u(v) |
|   } | |
| } | |

In Table 9, the entry point information may be information on an entry point of a WPP substream or information on an entry point of a tile.

num_of_entry_points_minus1 specifies a number of entry points in the bitstream in a slice. Since a number of entry point offsets is smaller by 1 than the number of entry points, num_of_entry_points_minus1 may also specify a number of syntax elements entry_point_offset[i] in the slice header.

entry_point_offset_length_minus1 specifies a number of bits used to signal information on an entry point offset (syntax element entry_point_offset). That is, entry_point_offset_length_minus1 may specify a length of syntax element entry_point_offset[i] in bits or bytes.

entry_point_type[i] specifies an entry point type. For instance, entry_point_type[i] equal to 1 specifies an entry point of a WPP substream, and entry_point_type[i] equal to 0 specifies an entry point of both a tile and a WPP substream.

entry_point_offset[i] specifies a number of bits or bytes between two entry points. When i is 0, entry_point_offset[0] specifies a number of bits or bytes between an end of the slice header and a first entry point in a slice. When i is not 0, entry_point_offset[i] specifies a number of bits or bytes between an entry point i−1 and an entry point i.

When an entry point is expressed in bytes, that is, a substream is byte-aligned, a byte-aligned hit may be used as described above in Embodiment 2.

When a number of bits used to transmit an entry point offset is specified using entry_point_offset_length_minus1, if the length of entry_point_offset[i] is xx, xx may be defined as Equation 3.

$$xx=(num\_substreams\_minus1>0)?entry\_point\_offset\_length\_minus1+4:entry\_point\_offset\_length\_minus1+1 \quad \text{[Equation 3]}$$

In Equation 3, WPP may be employed when a number of substreams is greater than 1, while a tile may be used when the number of substreams is 1 or smaller.

Embodiment 6 entry_point_location_flag specifying whether entry point information is present in a bitstream may be inferred or derived, instead of being signaled as in the foregoing embodiments.

For example, presence of entry point information may be inferred as follows, without transmitting a syntax element in a slice header which indicates whether entry point information is present in a bitstream.

In detail, when a number of rows in a tile is greater than 1 or a number of columns in the tile is greater than 1 and a number of substreams is greater than 1, it is inferred that entry point information is present in a bitstream. Otherwise, it is inferred that entry point information is absent in a bitstream.

Table 10 illustrates a method of inferring presence of entry point information.

TABLE 10

```
If ( ( num_tile_columns_minus1 > 0 || num_tile_rows_minus1
    > 0 ) && num_substreams_minus1 > 0) {
        entry_point_location_flag = 1
} else {
        entry_point_location_flag = 0
}
```

In Table 10, num_tile_columns_minus1+1 specifies a number of tile columns partitioning a picture, and num_tile_columns_minus1 may be signaled from the encoding apparatus. Also, num_tile_row_minus1+1 specifies a number of tile columns partitioning a picture, and num_tile_rows_minus1 may be signaled from the encoding apparatus.

Thus, when a slice includes a plurality of tiles and a plurality of substreams, it may be inferred that entry point information is present in a bitstream.

Table 11 illustrates a syntax in a slice header used to transmit entry point information.

TABLE 11

| slice_header( ) { | Descriptor |
|---|---|
| ... | |
| if (num_tile_columns_minus1 > 0 || num_tile_rows_minus1 > 0) && num_sub_streams_minus1 > 0) { | |
|     entry_point_locations ( ) | |
| } | |
| } | |

In the foregoing embodiments, entry_point_location_flag specifying presence of entry point information is transmitted through the slice header, in which entry_point_location_flag equal to 1 specifies that entry point information is present in the bitstream.

In Table 11, when a number of rows in a tile is greater than 1 or a number of columns in the tile is greater than 1 and a number of substreams is greater than 1, it is considered that entry point information is present in a bitstream. In this case, the entry point information may be transmitted as in Table 10.

Table 12 illustrates a syntax transmitted when entry point information is present in a bitstream as in Table 11.

TABLE 12

| entry_point_locations( ) | Descriptor |
|---|---|
| { | |
|   num_of_entry_points_minus1 | ue(v) |
|   entry_point_offset_length_minus1 | ue(v) |
|   for (i=0; i<num_of_entry_points_minus1; i++) { | |
|     entry_point_type[i] | u(1) |
|     entry_point_offset[i] | u(v) |
|   } | |
| } | |

In Table 12, num_of_entry_points_minus1 specifies a number of entry points in the bitstream in a slice. Since a number of entry point offsets is smaller by 1 than the number of entry points, num_of_entry_points_minus1 may also specify a number of syntax elements entry_point_offset[i] in the slice header.

entry_point_offset_length_minus1 specifies a number of bits used to signal information on an entry point offset (syntax element entry_point_offset). That is, entry_point_offset_length_minus1 may represent a length of syntax element entry_point_offset[i] in bits or bytes.

entry_point_type[i] specifies an entry point type. For instance, entry_point_type[i] equal to 1 specifies an entry point of a WPP substream, and entry_point_type[i] equal to 0 specifies an entry point of both a tile and a WPP substream.

entry_point_offset[i] specifies a number of bits or bytes between two entry points. When i is 0, entry_point_offset[0] specifies a number of bits or bytes between an end of the slice header and a first entry point in a slice. When i is not 0, entry_point_offset[i] specifies a number of bits or bytes between an entry point i−1 and an entry point i.

When an entry point is expressed in bytes, that is, a substream is byte-aligned, a byte-aligned bit may be used as described above in Embodiment 2.

Embodiment 7

When length information on an entry point offset is transmitted as in Embodiment 4, an entry point type may be conditionally signaled.

For example, when a slice includes a plurality of tiles and a plurality of substreams, an entry point type, that is, whether an entry type is about a tile or about a substream, may be signaled.

Table 13 illustrates a syntax in a slice header used to signal entry point information.

TABLE 13

| slice_header( ) { | Descriptor |
|---|---|
| ... | |
|   entry_point_locations_flag | u(1) |
|   if (entry_point_locations_flag == 1) { | |
|     entry_point_locations ( ) | |
|   } | |
| } | |

In Table 13, entry_point_location_flag specifies whether entry point information is present in a bitstream. For example, if the entry point information, for instance, entry point location information, is present in the bitstream, entry_point_location_flag is 1. If the entry point information is absent in the bitstream, entry_point_location_flag is 0.

Table 14 illustrates a syntax relating to the entry point location information in Table 13.

TABLE 14

| entry_point_locations( ) | Descriptor |
|---|---|
|   num_of_entry_points_minus1 | ue(v) |
|   entry_point_offset_length_minus2 | ue(v) |
|   for (i=0; i<=num_of_entry_points_minus1; i++) { | |
|     if ((num_tile_columns_minus1 > 0 || num_tile_rows_minus1 > 0) && num_substreams_minus1 > 0) { | |
|       entry_point_type[i] | u(1) |
|     } | |
|     else if (num_substreams_minus1 > 0) { | |
|       entry_point_type [i] = 1 | |
|     } | |
|     else { | |
|       entry_point_type [i] = 0 | |
|     } | |
|     entry_point_offset[i] | u(v) |
|   } | |
| } | | num_of_entry_points_minus1 specifies a number of entry points in the bitstream in a slice. Since a number of entry point offsets is smaller by 1 than the number of entry points, num_of_entry_points_minus1 may also specify a number of syntax elements entry_point_offset[i] in the slice header.

entry_point_offset_length_minus2 specifies a number of bits used to signal information on an entry point offset (syntax element entry_point_offset). That is, entry_point_offset_length_minus2 may represent a length of syntax element entry_point_offset[i] in bits or bytes.

When a number of rows in a tile is greater than 1 or a number of columns in the tile is greater than 1 and a number of substreams is greater than 1, that is, a plurality of tiles and a plurality of substreams are present, entry_point_type[i] specifying an entry point type is signaled.

entry_point_type[i] specifies an entry point type. For instance, entry_point_type[i] equal to 1 specifies an entry point of a WPP substream, and entry_point_type[i] equal to 0 specifies an entry point of both a tile and a WPP substream.

Thus, when a single tile or no tile is present but a plurality of substreams is present, entry_point_type[i] specifies an entry point of a WPP substream. In other cases, entry_point_type[i] specifies an entry point of both a tile and a WPP substream.

entry_point_offset[i] specifies a number of bits or bytes between two entry points. When i is 0, entry_point_offset[0] specifies a number of bits or bytes between an end of the slice header and a first entry point in a slice. When i is not 0, entry_point_offset[i] specifies a number of bits or bytes between an entry point i−1 and an entry point i.

When entry_point_offset[i] specifies a number of bytes between two entry points, a byte-aligned bit for byte-alignment may be used.

If the length of entry_point_offset[i] is xx, xx may be defined as Equation 4.

$$xx=(\text{num\_substreams\_minus1}>0)?\text{entry\_point\_offset\_length\_minus2}+5:\text{entry\_point\_offset\_length\_minus2}+2 \quad [\text{Equation 4}]$$

Embodiment 8

When length information on an entry point offset is transmitted as in Embodiment 5, an entry point type may be conditionally signaled.

For example, when a slice includes a plurality of tiles and a plurality of substreams, an entry point type, that is, whether an entry type is about a tile or about a substream, may be signaled.

Table 15 illustrates a syntax in a slice header used to signal entry point information.

TABLE 15

| slice_header( ) { | Descriptor |
|---|---|
| ... | |
|   entry_point_locations_flag | u(1) |
|   if (entry_point_locations_flag == 1) { | |
|     entry_point_locations ( ) | |
|   } | |
| } | |

In Table 15, entry_point_location_flag specifies whether entry point information is present in a bitstream. For example, if the entry point information, for instance, entry point location information, is present in the bitstream, entry_point_location_flag is 1. If the entry point information is absent in the bitstream, entry_point_location_flag is 0.

Table 16 illustrates a syntax relating to the entry point location information in Table 15.

TABLE 16

| entry_point_locations( ) | Descriptor |
|---|---|
|   num_of_entry_points_minus1 | ue(v) |
|   entry_point_offset_length_minus1 | ue(v) |
|   for (i=0; i<=num_of_entry_points_minus1; i++) { | |
|     if ((num_tile_columns_minus1 > 0 \|\| | |
|     num_tile_rows_minus1 > 0) && | |
|     num_substreams_minus1 > 0) { | |
|       entry_point_type[i] | u(1) |
|     } | |
|     else if (num_substreams_minus1 > 0) { | |
|       entry_point_type [i] = 1 | |
|     } | |
|     else { | |
|       entry_point_type [i] = 0 | |
|     } | |
|     entry_point_offsett[i] | u(v) |
|   } | |
| } | | num_of_entry_points_minus1 specifies a number of entry points in the bitstream in a slice. Since a number of entry point offsets is smaller by 1 than the number of entry points, num_of_entry_points_minus1 may also specify a number of syntax elements entry_point_offset[i] in the slice header.

entry_point_offset_length_minus1 specifies a number of bits used to signal information on an entry point offset (syntax element entry_point_offset). That is, entry_point_offset_length_minus1 may represent a length of syntax element entry_point_offset[i] in bits or bytes.

When a number of rows in a tile is greater than 1 or a number of columns in the tile is greater than 1 and a number of substreams is greater than 1, that is, a plurality of tiles and a plurality of substreams are present, entry_point_type[i] specifying an entry point type is signaled.

entry_point_type[i] specifies an entry point type. For instance, entry_point_type[i] equal to 1 specifies an entry point of a WPP substream, and entry_point_type[i] equal to 0 specifies an entry point of both a tile and a WPP substream.

Thus, when a single tile or no tile is present but a plurality of substreams is present, entry_point_type[i] specifies an entry point of a WPP substream. In other cases, entry_point_type[i] specifies an entry point of both a tile and a WPP substream.

entry_point_offset[i] specifies a number of bits or bytes between two entry points. When i is 0, entry_point_offset[0] specifies a number of bits or bytes between an end of the slice header and a first entry point in a slice. When i is not 0, entry_point_offset[i] specifies a number of bits or bytes between an entry point i−1 and an entry point i.

When entry_point_offset[i] specifies a number of bytes between two entry points, a byte-aligned bit for byte-alignment may be used.

If the length of entry_point_offset[i] is xx, xx may be defined as Equation 4.

$$xx=(\text{num\_substreams\_minus1}>0)?\text{entry\_point\_offset\_length\_minus2}+4:\text{entry\_point\_offset\_length\_minus2}+1 \quad [\text{Equation 5}]$$

In Equation 5, WPP may be employed when a number of substreams is greater than 1, while a tile may be used when the number of substreams is 1 or smaller.

Embodiment 9

When length information on an entry point offset is transmitted as in Embodiment 4, an entry point type may be inferred, instead of being signaled.

For example, an entry point type, that is, whether an entry point is about a tile or about a WPP substream, may be inferred as follows.

(1) If tile_info_present_flag is 1 and num_substream_minus1 is 0, that is, tile_info_present_flag==1 && num_substream_minus1==0, all entry points are entry points of tiles. That is, if tile information is present and the number of substreams is 1, all entry points may be inferred as entry points of tiles.

(2) If tile_info_present_flag is 0 and num_substream_minus1 is greater than 0, that is, tile_info_present_flag==0 && num_substream_minus1>0, all entry points are entry points of WPP substreams. That is, if tile information is absent and a plurality of substreams is present, all entry points may be inferred as entry points of WPP substreams.

(3) If tile_info_present_flag is 1 and num_substream_minus1 is greater than 0, that is, tile_info_present_flag==1 && num_substream_minus1>0, when i is not 0 (i!=0) and (i+1)%(num_substream1+1)==0, an i-th entry point is an entry point of a tile that is an i-th entry point. Otherwise, entry points are entry points of WPP substreams. That is, if tile information is present and a plurality of substreams is present, entry points may be inferred as entry points of WPP substreams or entry points of tiles and WPP substreams.

Table 17 illustrates a syntax in a slice header used to signal entry point information.

TABLE 17

| slice_header( ) { | Descriptor |
|---|---|
| ... | |
|     entry_point_locations_flag | u(1) |
|     if (entry_point_locations_flag == 1) { | |
|         entry_point_locations ( ) | |
|     } | |
| } | |

In Table 17, entry_point_location_flag specifies whether entry point information is present in a bitstream. For example, if the entry point information, for instance, entry point location information, is present in the bitstream, entry_point_location_flag is 1. If the entry point information is absent in the bitstream, entry_point_location_flag is 0.

Table 18 illustrates a syntax relating to the entry point location information in Table 17.

TABLE 18

| entry_point_locations( ) | Descriptor |
|---|---|
|     num_of_entry_points_minus1 | ue(v) |
|     entry_point_offset_length_minus2 | ue(v) |
|     for (i=0; i<=num_of_entry_points_minus1; i++) { | |
|         entry_point_offset[i] | u(v) |
|     } | |
| } | | num_of_entry_points_minus1 specifies a number of entry points in the bitstream in a slice. Since a number of entry point offsets is smaller by 1 than the number of entry points, num_of_entry_points_minus1 may also specify a number of syntax elements entry_point_offset[i] in the slice header.

entry_point_offset_length_minus2 specifies a number of bits used to signal information on an entry point offset (syntax element entry_point_offset). That is, entry_point_offset_length_minus2 may represent a length of syntax element entry_point_offset[i] in bits or bytes.

entry_point_offset[i] specifies a number of bits or bytes between two entry points. When i is 0, entry_point_offset[0] specifies a number of bits or bytes between an end of the slice header and a first entry point in a slice. When i is not 0, entry_point_offset[i] specifies a number of bits or bytes between an entry point i−1 and an entry point i.

When entry_point_offset[i] specifies a number of bytes between two entry points, a byte-aligned bit for byte-alignment may be used.

In Table 18, an entry point type is not directly signaled. Instead, in embodiment 9, an entry point type is inferred based on tile_info_present_flag and num_substream_minus1 as described above.

Embodiment 10

When length information on an entry point offset is transmitted as in Embodiment 5, an entry point type may be inferred, instead of being signaled.

For example, an entry point type, that is, whether an entry point is about a tile or about a WPP substream, may be inferred as follows.

(1) If tile_info_present_flag is 1 and num_substream_minus1 is 0, that is, tile_info_present_flag==1 && num_substream_minus1==0, all entry points are entry points of tiles. That is, if tile information is present and the number of substreams is 1, all entry points may be inferred as entry points of tiles.

(2) If tile_info_present_flag is 0 and num_substream_minus1 is greater than 0, that is, tile_info_present_flag==0 && num_substream_minus1>0, all entry points are entry points of WPP substreams. That is, if tile information is absent and a plurality of substreams is present, all entry points may be inferred as entry points of WPP substreams.

(3) If tile_info_present_flag is 1 and num_substream_minus1 is greater than 0, that is, tile_info_present_flag==1 && num_substream_minus1>0, when i is not 0 (i!=0) and (i+1)%(num_substream1+1)==0, an i-th entry point is an entry point of a tile that is an i-th entry point. Otherwise, entry points are entry points of WPP substreams. That is, if tile information is present and a plurality of substreams is present, entry points may be inferred as entry points of WPP substreams or entry points of tiles and WPP substreams.

Table 19 illustrates a syntax in a slice header used to signal entry point information.

TABLE 19

| slice_header( ) { | Descriptor |
|---|---|
| ... | |
|     entry_point_locations_flag | u(1) |
|     if (entry_point_locations_flag == 1) { | |
|         entry_point_locations ( ) | |
|     } | |
| } | |

In Table 19, entry_point_location_flag specifies whether entry point information is present in a bitstream. For example, if the entry point information, for instance, entry point location information, is present in the bitstream, entry_point_location_flag is 1. If the entry point information is absent in the bitstream, entry_point_location_flag is 0.

Table 20 illustrates a syntax relating to the entry point location information in Table 19.

TABLE 20

| entry_point_locations( ) | Descriptor |
|---|---|
| num_of_entry_point_minus1 | ue(v) |
| entry_point_offset_length_minus1 | ue(v) |
|     for (i=0; i<=num_of_entry_points minus1; i++) { | |
|         entry_point_offset[i] | u(v) |
|     } | |
| } | | num_of_entry_points_minus1 specifies a number of entry points in the bitstream in a slice. Since a number of entry point offsets is smaller by 1 than the number of entry points, num_of_entry_points_minus1 may also specify a number of syntax elements entry_point_offset[i] in the slice header.

entry_point_offset_length_minus1 specifies a number of bits used to signal information on an entry point offset (syntax element entry_point_offset). That is, entry_point_offset_length_minus1 may represent a length of syntax element entry_point_offset[i] in bits or bytes.

entry_point_offset[i] specifies a number of bits or bytes between two entry points. When i is 0, entry_point_offset[0] specifies a number of bits or bytes between an end of the slice header and a first entry point in a slice. When i is not 0, entry_point_offset[i] specifies a number of bits or bytes between an entry point i−1 and an entry point i.

When entry_point_offset[i] specifies a number of bytes between two entry points, a byte-aligned bit for byte-alignment may be used.

In Table 20, an entry point type is not directly signaled. Instead, in embodiment 10, an entry point type is inferred based on tile_info_present_flag and num_substream_minus1 as described above.

Embodiment 11

Embodiment 11 illustrates a method based on the foregoing ten embodiments in combination with at least one of the following modifications or characteristics (1) to (4).

(1) When either a tile or WPP is used for parallel decoding, entry point information is transmitted. Thus, entry_point_location_flag specifying existence of entry point information described in the foregoing embodiments may be unnecessary.

(2) Considering that a tile and WPP are not used, information specifying a number of entry points may be transmitted using num_of_entry_points, instead of num_of_entry_points_minus1, so as to indicate a value of 0. That is, a value representing a total number of entry points may be transmitted, instead of a value representing the total number of entry points minus 1.

(3) WPP and a tile may not be used together. In this case, a tile is not used when WPP is employed, and WPP is not used when a tile is employed.

(4) An entry point offset may be derived from NALU data of byte 0. Byte 0 may be a first byte of slice segment data.

When characteristic (1) is added, Embodiment 11 may directly signal necessary entry point information without transmitting entry_point_location_flag specifying existence of entry point information via a slice header, unlike the foregoing ten embodiments.

Table 21 illustrates a syntax in a slice header used to signal entry point information on a WPP substream or tile according to Embodiment 11.

TABLE 21

| Slice_header( ) | Descriptor |
|---|---|
| { | |
|   ... | |
|   num_of_entry_points | ue(v) |
|   if (num_of_entry_points > 0) | |
|   { | |
|     entry_point_offset_length_minus1 | ue(v) |
|     for i=0; i<num_of_entry_points; i++) { | |
|       entry_point_offsett[i] | u(v) |
|     } | |
|   } | |
|   ... | |
| } | | num_of_entry_points_minus1 specifies a number of entry points in the bitstream in a slice. Since a number of entry point offsets is smaller by 1 than the number of entry points, num_of_entry_points_minus1 may also specify a number of syntax elements entry_point_offset[i] in the slice header.

entry_point_offset_length_minus1 specifies a number of bits used to signal information on an entry point offset (syntax element entry_point_offset). That is, entry_point_offset_length_minus1 may represent a length of syntax element entry_point_offset[i] in bits or bytes. Although the present embodiment illustrates that entry_point_offset_length_minus1 is signaled, entry_point_offset_length_minus2 may be signaled instead of entry_point_offset_length_minus1.

entry_point_offset[i] specifies a number of bits or bytes between two entry points. When i is 0, entry_point_offset[0] specifies a number of bytes between a start (byte 0) of NAL unit data and a first entry point (entry_point_offset[0]−1) in a slice. When i is not 0, entry_point_offset[i] specifies a number of bits or bytes between an entry point i−1 and an entry point i.

When entry_point_offset[i] specifies a number of bytes between two entry points, a byte-aligned bit for byte-alignment may be used.

The length of entry_point_offset[i] may be entry_point_offset_length_minus1+1 bits or entry_point_offset_length_minus2+2 bits.

Figure 12:
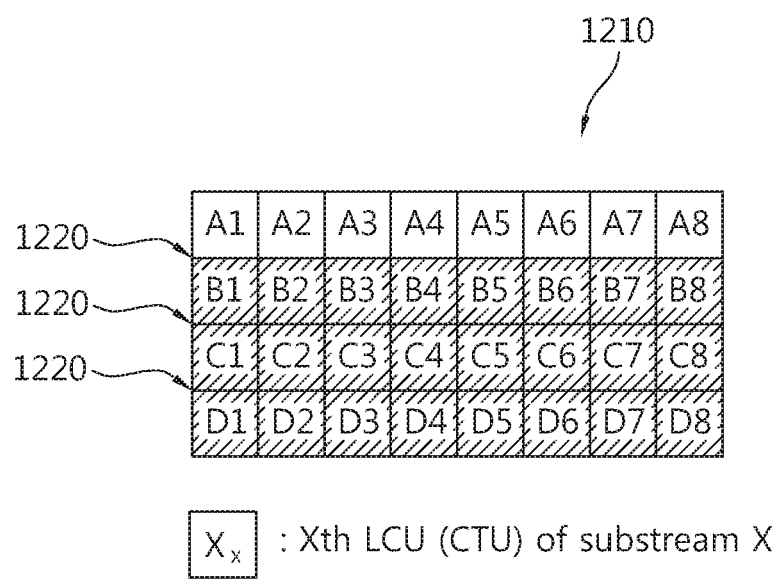
FIG. 12 schematically illustrates an entry point of a WPP substream according to an exemplary embodiment.

FIG. 12 schematically illustrates an entry point of a WPP substream.

In FIG. 12, a predetermined region 1210 of a picture includes four substreams which are substream A, substream B, substream C and substream D. Each substream may be an array of LCUs.

A start point of each substream may be indicated by an entry point. For example, if an entry point of substream A may be specified from a start point of a bitstream or an end point of a slice header, an entry point of substream B is entry point 0 1220, an entry point of substream C is entry point 1 1230, and an entry point of substream D is entry point 2 1240.

In this case, entry point 0 1220 as a first entry point may be a value of the end point of the slice header plus an entry point offset, for example, entry_point_offset[0], representing a number of bytes or bits between the end point of the slice header and the first entry point. Likewise, a number of bytes or bits between entry point 1 1220 as the first entry point and entry point 2 1230 as a second entry point may be indicated by an entry point offset, for example, entry_point_offset[1].

In FIG. 12, the predetermined region 1210 of the picture may be part of the current picture, a slice of the current picture or an entire region of the current picture.

Figure 13:
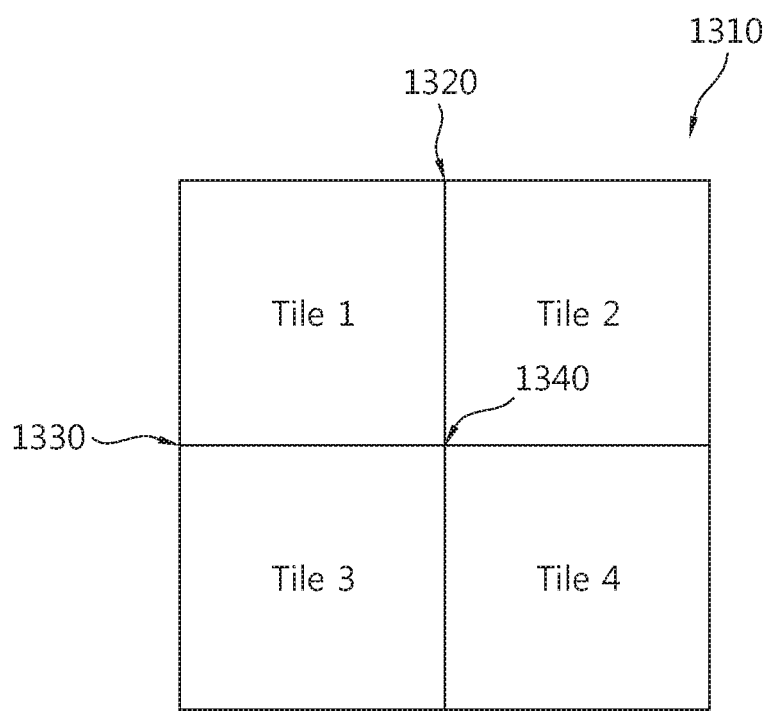
FIG. 13 schematically illustrates an entry point of a tile according to an exemplary embodiment.

FIG. 13 schematically illustrates an entry point of a tile.

In FIG. 13, a predetermined region 1310 of a picture includes four tiles which are tile 1, tile 2, tile 3 and tile 4.

A start point of each tile may be indicated by an entry point. For example, if an entry point of tile 1 may be specified from a start point of a bitstream or an end point of a slice header, an entry point of tile 2 is entry point 0 1320, an entry point of tile 3 is entry point 1 1330, and an entry point of tile 4 is entry point 2 1340.

In this case, entry point 0 1320 as a first entry point may be a value of the end point of the slice header plus an entry point offset, for example, entry_point_offset[0], representing a number of bytes or bits between the end point of the slice header and the first entry point. Likewise, a number of bytes or bits between entry point 1 1320 as a first entry point and entry point 2 1330 as a second entry point may be indicated by an entry point offset, for example, entry_point_offset[1].

In FIG. 13, the predetermined region 1310 of the picture may be part of the current picture, a slice of the current picture or an entire region of the current picture.

Figure 14:
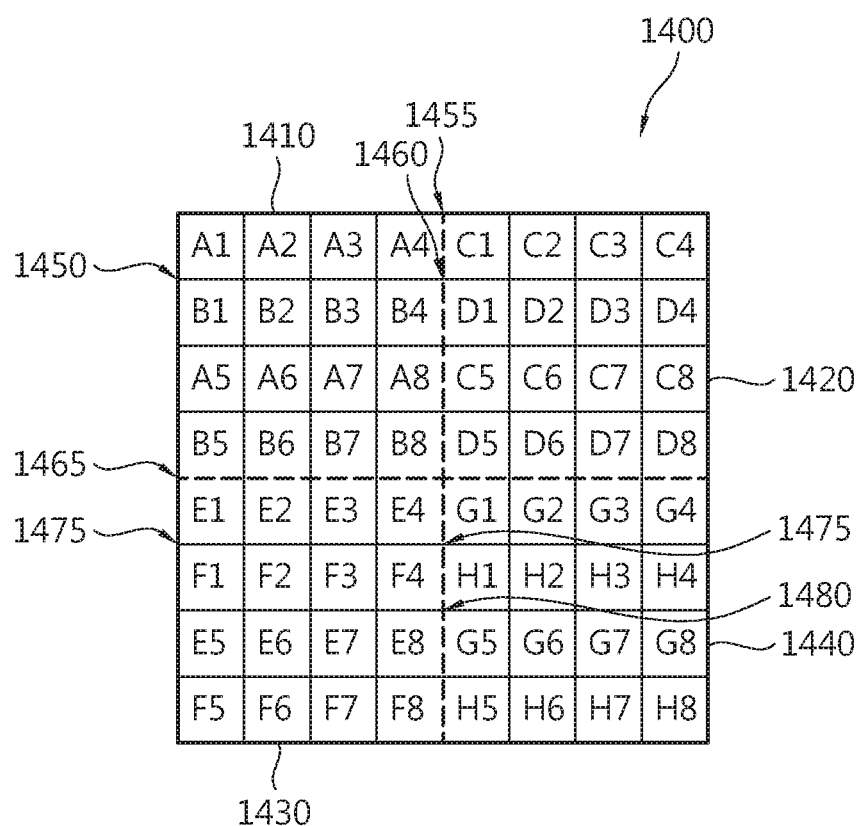
FIG. 14 schematically illustrates an entry point when a tile and a WPP substream are used together according to an exemplary embodiment.

FIG. 14 schematically illustrates an entry point when a tile and a WPP substream are employed together.

In FIG. 14, a predetermined region 1410 of a picture includes four tiles which are tile 1 1410, tile 2 1420, tile 3 1430 and tile 4 1440.

Each tile includes two substreams. For example, tile 1 1410 includes substream A and substream B. Tile 2 1420 includes substream C and substream D. Tile 3 1430 includes substream E and substream F. Tile 4 1440 includes substream G and substream H.

A start point of each tile and/or substream may be indicated by an entry point. For example, an entry point of tile 1 1410 may be specified from a start point of a bitstream or an end point of a slice header, and an entry point of substream A may also be specified from the start point of the bitstream or the end point of the slice header. An entry point of substream B as a second substream in tile 1 1410 is entry point 0 1450.

An entry point of tile 2 1420 and substream C is entry point 1 1455. An entry point of substream D in tile 2 1420 is entry point 2 1460.

An entry point of tile 3 1430 and substream E is entry point 1 1465. An entry point of substream F in tile 3 1430 is entry point 2 1470.

An entry point of tile 4 1440 and substream G is entry point 1 1475. An entry point of substream H in tile 4 1440 is entry point 2 1480.

In this case, entry point 0 1450 as a first entry point may be a value of the end point of the slice header plus an entry point offset, for example, entry_point_offset[0], representing a number of bytes or bits between the end point of the slice header and the first entry point.

Entry point 1 1455 as a second entry point may be indicated by a value of entry point 0 1450 as the first entry point plus an entry point offset, for example entry_point_offset[1]. Entry point 2 1460 as a third entry point may be indicated by a value of entry point 1 1455 as the second entry point plus an entry point offset, for example entry_point_offset[2]. Entry point 3 1465 as a fourth entry point may be indicated by a value of entry point 2 1460 as the third entry point plus an entry point offset, for example entry_point_offset[3]. Entry point 4 1470 as a fifth entry point may be indicated by a value of entry point 3 1465 as the fourth entry point plus an entry point offset, for example entry_point_offset[4]. Entry point 5 1475 as a sixth entry point may be indicated by a value of entry point 4 1470 as the fifth entry point plus an entry point offset, for example entry_point_offset[5]. Entry point 6 1480 as a seventh entry point may be indicated by a value of entry point 5 1475 as the sixth entry point plus an entry point offset, for example entry_point_offset[6].

Figure 15:
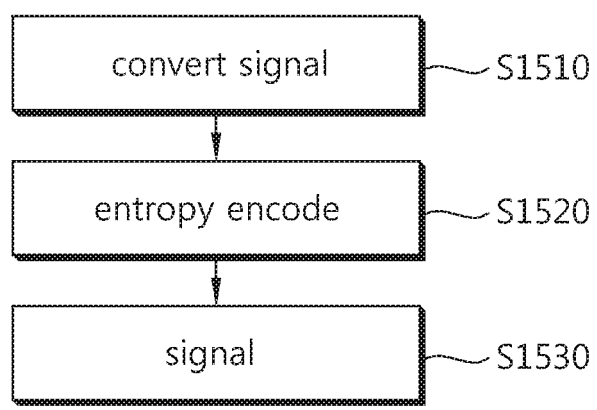
FIG. 15 is a flowchart schematically illustrating an encoding method according to an exemplary embodiment of the present invention.

FIG. 15 is a flowchart schematically illustrating an encoding method according to an exemplary embodiment of the present invention.

Referring to FIG. 15, an encoding apparatus Wray convert an input video signal (S1510). The encoding apparatus may partition an input picture into encoding units and perform prediction based on the partitioned encoding units or subdivided units. The encoding apparatus generates a residual as a difference between a prediction result and an original signal. The encoding apparatus transforms and quantizes the residual. DCT and/or DST may be used for transformation.

Prediction methods, transform methods and quantization methods are illustrated above in FIG. 1.

The encoding apparatus may entropy-encode the converted signal (S1520). CABAC, VLC and exponential Golomb may be used for entropy encoding.

The encoding apparatus signals entropy-encoded video information and information necessary for decoding via a bitstream (S1530). When parallel decoding is employed, the signaled information may include information necessary for parallel processing, for example, entry point information, in a slice header.

As described above, the entry point information includes entry point offset information, information on a number of entry points and information on a length of an entry point offset.

For example, entry point offset information, entry_point_offset[i], transmitted via a slice header specifies an i-th entry point offset in bytes. entry_point_offset[i] may be represented by the information on the length of the entry point offset. For instance, if information specifying a length of an entry point offset is entry_point_offset_length_minus1, the entry point offset may be represented by a value of entry_point_offset_length_minus1 plus one bit.

Slice segment data following the slice header may include a number of subsets specified by information on a number of entry points, and parallel decoding may be performed by a subset. Since the number of entry points is greater by 1 than a number of entry point offsets for offsetting neighboring entry points, the number of entry points in a slice may be specified based on the number of entry point offsets signaled via the slice header. For example, when the number of entry point offsets is N, N+1 subsets are present.

As described above, an i-th entry point in the slice is a value of an (i−1)-th entry point plus an i-th entry point offset.

Alternatively, a range of an i-th subset among the subsets forming the slice segment data may be specified using the i-th entry point offset. For example, a 0-th subset may have a range from a first byte (byte 0) of the slice segment data to a 0-th entry point offset-1. A first byte in the range of the i-th subset (i is an integer excluding 0) is sum of previous subsets that is a sum of previous entry point offsets, and a last byte is a value of the first byte plus the i-th entry point offset, minus a 1 bit.

As described above, the information on the number of entry point offsets may specify a number of syntax elements entry_point_offset[i] in the slice header. For example, when WPP is employed, the number of entry point offsets may have a value in a range from 0 to a number of CTB rows in the picture. When a tile is employed, the number of entry point offsets may have a value in a range from 0 to a number of tiles−1. When a tile and WPP are employed together, the number of entry point offsets may have a value range from 0 to a number of tile columns*a number of CTB rows−1.

Furthermore, the information on the number of entry point offset syntax elements specifies the number of syntax elements entry_point_offset[i] in the slice header. For example, since the number of entry point offsets is smaller by 1 than the number of entry points, the information on the number of entry point offset syntax elements may be transmitted as num_of_entry_point_minus1. Alternatively, the number of entry point offsets may be directly transmitted as num_of entry_point_offset.

The information on the length of the entry point offset may specify a length of syntax element entry_point_offset[i] in bits. For instance, if information on a length of an entry point offset syntax element is transmitted as entry_point_offset_length_minus1, the length of the entry point offset syntax element is entry_point_offset_length_minus1+1 bits. Alternatively, if the information on the length of the entry point offset syntax element is transmitted as entry_point_offset_length_minus2, the length of the entry point offset syntax element is entry_point_offset_length_minus2+2 bits. The length of the entry point offset syntax element may be also transmitted as a syntax element of entry_point_offset_length, in which case the length of the entry point offset syntax element is entry_point_offset_length bits.

Figure 16:
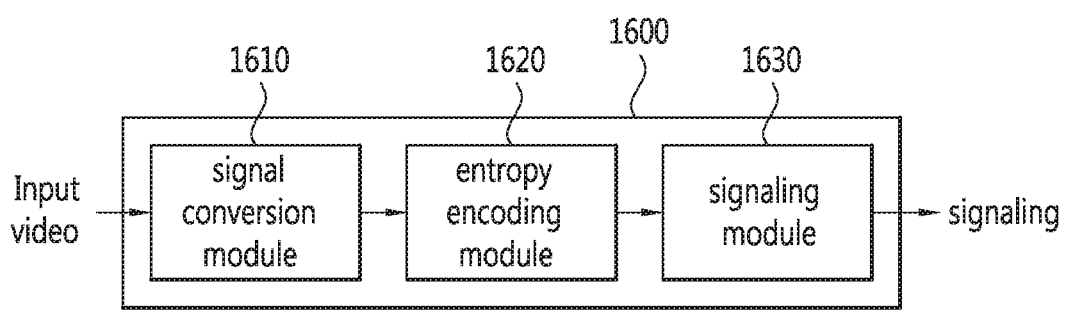
FIG. 16 is a block diagram schematically illustrating an encoding apparatus according to an exemplary embodiment of the present invention.

FIG. 16 is a block diagram schematically illustrating an encoding apparatus according to an exemplary embodiment of the present invention.

Referring to FIG. 16, the encoding apparatus 1600 includes a signal conversion module 1610, an entropy encoding module 1620 and a signaling module 1630.

The signal conversion module 1610 may partition an input picture (video) into encoding units and perform prediction based on the partitioned encoding units or subdivided units. The signal conversion module 1610 generates a residual as a difference between a prediction result and an original signal. The signal conversion module 1610 transforms and quantizes the residual. DCT and/or DST may be used for transformation.

The signal conversion module 1610 may include the picture partition module 105, the prediction module 110, the transform module 115, the quantization module 120 and the rearrangement module 125 and perform equivalent operations to those of the picture partition module 105, the prediction module 110, the transform module 115, the quantization module 120 and the rearrangement module 125.

The entropy encoding module 1620 may entropy-encode the signal output from the signal conversion module 1610.

The entropy encoding module 1620 may correspond to the entry encoding module 130 of FIG. 1 and perform equivalent operations to those of the entropy encoding module 130.

The signaling module 1630 signals encoded video information and information necessary for decoding via a bitstream. When parallel decoding is employed, the signaled information may include information necessary for parallel processing, for example, entry point information, in a slice header.

The entry point information includes entry point offset information, information on a number of entry points and information on a length of an entry point offset.

As described above, an i-th entry point in a slice is a value of an (i−1)-th entry point plus an i-th entry point offset. Thus, the information on the number of entry points may be information representing a number of entry point offset informations transmitted in the slice header.

Figure 17:
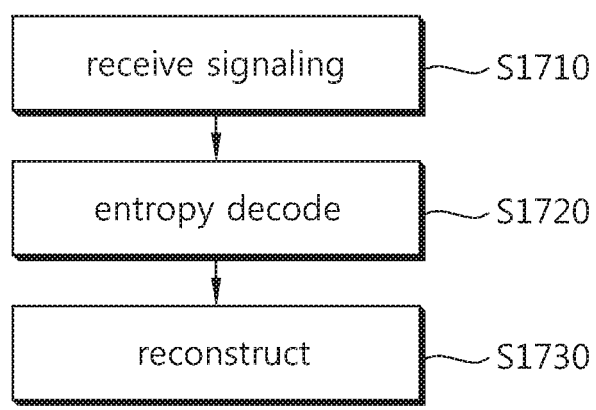
FIG. 17 is a flowchart schematically illustrating a decoding method according to an exemplary embodiment of the present invention.

FIG. 17 is a flowchart schematically illustrating a decoding method according to an exemplary embodiment of the present invention.

Referring to FIG. 17, a decoding apparatus receives signaling about video information from an encoding apparatus (S1710). The video information may be signaled via an encoded bitstream.

The decoding apparatus may entropy-decode the received bitstream (S1720). The decoding apparatus may receive data bits transmitted in the bitstream to output syntax element values. A syntax element refers to an element of data represented in the bitstream.

When parallel decoding is performed, data may be byte-aligned. Here, byte-aligning data means putting the data at a position in the bitstream in bytes. For example, when the position in the bitstream is an integer multiple of 8 bits from a first bit of the bitstream, the position is byte-aligned.

Byte alignment of a substream is described above.

When CABAC is employed for entropy decoding, the decoding may sequentially conduct initialization, binarization and decoding.

The decoding apparatus may perform initialization when at least one of parsing slice segment data, parsing a first CTU or LCU of a tile and parsing a first CTU or LCU in a row of CTUs or LCUs starts.

The decoding apparatus may generate initial values of parameters for performing CABAC by initialization.

Binarization is a set of bin strings with respect to values of syntax elements. Binarization is a unique mapping process of mapping possible values of syntax elements to a set of bin strings.

The decoding apparatus may output a syntax element value by mapping with a bin string, that is, a binary sequence or binary code, by binarization. The decoding apparatus may use a table of mapping a syntax element to a bin string for binarization.

The decoding apparatus may determine a syntax element value through a decoding process of CABAC. The decoding apparatus may determine a bin index for each bin of a bin string and determine a context index based on the bin index. The decoding apparatus may determine a random variable with respect to a bin string to be decoded using the context index and output a syntax element value. The decoding apparatus may use a table and also consider a type of a picture or slice (I slice, B slice or P slice) to be decoded when determining the context index based on the bin index.

The row of the CTUs or LCUs may be a WPP substream. If WPP is employed, when a second CTU or LCU in an n-th substream (n-th row of CTU or LCU row) is completely entropy-decoded, related context information may be stored. A first CTU or LCU in an (n+1)-th substream may be initialized based on the context information on the second CTU or LCU in the n-th substream.

The decoding apparatus may reconstruct a picture based on the syntax element values (S1730). As described above, the syntax element values may be signaled from the encoding apparatus and obtained via entropy decoding.

When parallel decoding is performed, a tile or WPP may be used. In this case, syntax elements may include information specifying an entry point of a tile or information specifying an entry point of a WPP substream.

Syntax elements specifying entry points, for example, a syntax element specifying a number of entry points, a syntax element specifying an entry point offset, a syntax element specifying a length of a syntax element relating to an entry point offset, a syntax element specifying an entry point type and a syntax element specifying existence of entry point information, have been described above.

Here, the syntax elements about the entry points transmitted from the encoding apparatus may be all or part of the syntax elements described above in the foregoing embodiments.

Although FIG. 17 illustrates the entropy decoding operation (S1720) and the reconstructing operation (S1730) separately for better understanding, the entropy decoding operation (S1720) and the reconstructing operation (S1730) may be considered as a single decoding operation.

Figure 18:
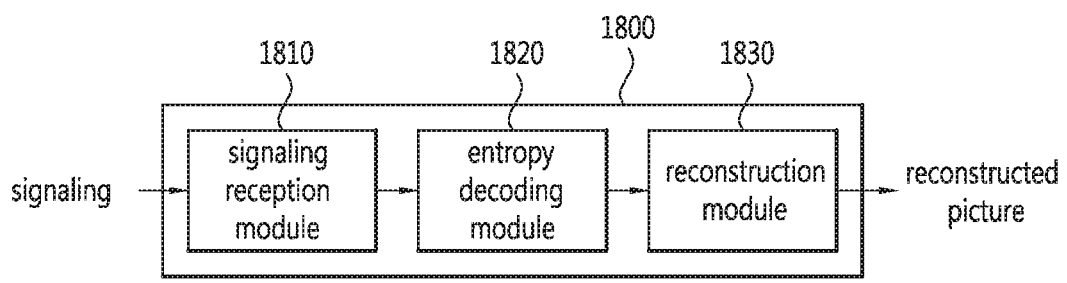
FIG. 18 is a block diagram schematically illustrating a decoding apparatus according to an exemplary embodiment of the present invention.

FIG. 18 is a block diagram schematically illustrating a decoding apparatus according to an exemplary embodiment of the present invention.

Referring to FIG. 18, the decoding apparatus 1800 includes a signaling reception module 1810, an entropy decoding module 1820 and a reconstruction module 1830.

The signaling reception module 1810 receives signaling about video information from an encoding apparatus. The video information may be signaled via an entropy-encoded bitstream.

The entropy decoding module 1820 may entropy-decode the received bitstream. The decoding apparatus may receive data bits transmitted in the bitstream to output syntax element values. Entropy decoding has been described above with reference to FIG. 17.

The entropy decoding module 1820 corresponds to the entropy decoding module 210 of FIG. 2.

The reconstruction module 1830 may reconstruct a picture based on the syntax element values output from the entropy decoding module 1820. The reconstruction module 1830 may include the rearrangement module 215, the dequantization module 220, the inverse transform module 225, the prediction module 230, the filter module 235 and the memory 240 and perform equivalent operations to those of the rearrangement module 215, the dequantization module 220, the inverse transform module 225, the prediction module 230, the filter module 235 and the memory 240.

Although FIG. 18 illustrates the entropy decoding module 1820 and the reconstruction module 1830 separately for better understanding, the entropy decoding module 1820 and the reconstruction module 1830 may be configured as a single decoding module.

Although methods of illustrative systems have been described with a series of stages or blocks based on the flowcharts, the present invention is not limited to the foregoing sequence of the stages. Some stages may be carried out in different order from described above or at the same time. Further, it should be noted that as the aforementioned embodiments may include various aspects of examples. Thus, it will be appreciated that changes, modifications and alternatives may be made in these exemplary embodiments without departing from the principles and spirit of be the invention, the scope of which is defined in the appended claims and their equivalents.

It will be understood that when an element is referred to as being "coupled to" or "connected to" another element, the element can be directly coupled to or connected to another element or layer or intervening elements or layers. In contrast, when an element is referred to as being "directly coupled to" or "directly connected to" another element or layer, there are no intervening elements or layers present.

The invention claimed is:

1. A video encoding method, performed by an encoding apparatus, comprising:

deriving entry point information specifying an entry point of a substream for a picture;

encoding the entry point information to generate a bitsream; and outputting the generated bitstream, wherein the entry point information include a number syntax element representing a number of offset syntax elements in a slice header, wherein the entry point information includes an offset syntax element when the number of the offset syntax elements is larger than 0, wherein the offset syntax element represents an entry point offset between two entry points, wherein the entry point information includes a length syntax element when the number of the offset syntax elements is larger than 0, wherein the length syntax element represents a bits length for the offset syntax element, wherein the offset syntax element represents the number of bytes between the two entry points, wherein a value of the length syntax element plus one corresponds to the bits length of the offset syntax element, wherein a value of the number syntax element corresponds to the number of offset syntax elements in the slice header, and wherein the entry point information is configured in the slice header.

2. The method of claim 1, wherein the number of the offset syntax elements is determined based on whether two or more tiles are present in the picture and whether rows of coding tree units in the picture are parallel decoded.

3. The method of claim 2, wherein a maximum value of the number syntax element is determined as a number of the rows of coding tree units in the picture minus one when two or more tiles are not present in the picture and the rows of coding tree units are parallel decoded.

4. The method of claim 2, wherein a maximum value of the number syntax element is determined as a number of tiles in the picture multiplied by a number of the rows of coding tree units minus one when two or more tiles are present in the picture and the rows of coding tree units are parallel decoded.

5. A video decoding method, performed by a decoding apparatus, comprising:

obtaining entry point information specifying an entry point of a substream for a picture from a bitstream; and reconstructing the picture based on the entry point information, wherein the entry point information include a number syntax element representing a number of offset syntax elements in a slice header, wherein the entry point information includes an offset syntax element when the number of the offset syntax elements is larger than 0, wherein the offset syntax element represents an entry point offset between two entry points, wherein the entry point information includes a length syntax element when the number of the offset syntax elements is larger than 0, wherein the length syntax element represents a bits length of the offset syntax element, wherein the offset syntax element represents the number of bytes between the two entry points, wherein a value of the length syntax element plus one corresponds to the bits length of the offset syntax element, wherein a value of the number syntax element corresponds to the number of offset syntax elements in the slice header, and wherein the entry point information is configured in the slice header.

6. The method of claim 5, wherein the number of the offset syntax elements is determined based on whether two or more tiles are present in the picture and whether rows of coding tree units in the picture are parallel decoded.

7. The method of claim 6, wherein a maximum value of the number syntax element is determined as a number of the rows of coding tree units in the picture minus one when two or more tiles are not present in the picture and the rows of coding tree units are parallel decoded.

8. The method of claim 6, wherein a maximum value of the number syntax element is determined as a number of tiles in the picture multiplied by a number of the rows of coding tree units minus one when two or more tiles are present in the picture and the rows of coding tree units are parallel decoded.

9. A non-transitory computer readable storage medium storing encoded information causing a video decoding apparatus to perform operations comprising: obtaining entry point information specifying an entry point of a substream for a picture from the encoded information; and reconstructing the picture based on the entry point information, wherein the entry point information include a number syntax element representing a number of offset syntax elements in a slice header, wherein the entry point information includes an offset syntax element when the number of the offset syntax elements is larger than 0, wherein the offset syntax element represents an entry point offset between two entry points, wherein the entry point information includes a length syntax element when the number of the offset syntax elements is larger than 0, wherein the offset syntax element represents the number of bytes between the two entry points, wherein the length syntax element represents a bits length of the offset syntax element, wherein a value of the length syntax element plus one corresponds to the bits length of the offset syntax element, wherein a value of the number syntax element corresponds to the number of offset syntax elements in the slice header, and wherein the entry point information is configured in the slice header.

* * * * *